United States Patent
Tanaka et al.

(10) Patent No.: US 9,176,334 B2
(45) Date of Patent: Nov. 3, 2015

(54) DISPLAY DEVICE AND METHOD FOR MOUNTING THE SAME

(75) Inventors: Shogo Tanaka, Kobe (JP); Shinya Tanaka, Kobe (JP); Minoru Maehata, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 889 days.

(21) Appl. No.: 11/921,741

(22) PCT Filed: Jun. 27, 2006

(86) PCT No.: PCT/JP2006/313182
§ 371 (c)(1),
(2), (4) Date: Dec. 7, 2007

(87) PCT Pub. No.: WO2007/001071
PCT Pub. Date: Jan. 4, 2007

(65) Prior Publication Data
US 2009/0096811 A1  Apr. 16, 2009

(30) Foreign Application Priority Data

Jun. 28, 2005  (JP) .................................. 2005-188009
May 22, 2006  (JP) .................................. 2006-141414

(51) Int. Cl.
| | |
|---|---|
| H04N 13/04 | (2006.01) |
| H04N 15/00 | (2006.01) |
| G02F 1/13 | (2006.01) |
| G02B 27/01 | (2006.01) |
| B60R 11/02 | (2006.01) |
| G02F 1/1335 | (2006.01) |

(52) U.S. Cl.
CPC .......... *G02F 1/1313* (2013.01); *G02B 27/0101* (2013.01); *B60R 11/0235* (2013.01); *G02B 2027/0123* (2013.01); *G02B 2027/0129* (2013.01); *G02F 1/133512* (2013.01)

(58) Field of Classification Search
CPC .............................................. G02B 2027/0129
See application file for complete search history.

(56) References Cited

U.S. PATENT DOCUMENTS

| | | | |
|---|---|---|---|
| 6,046,849 A | 4/2000 | Moseley et al. | |
| 6,055,013 A | 4/2000 | Woodgate et al. | |
| 6,055,103 A | 4/2000 | Woodgate et al. | |
| 6,377,295 B1 | 4/2002 | Woodgate et al. | |

(Continued)

FOREIGN PATENT DOCUMENTS

| | | |
|---|---|---|
| GB | 2 405 546 A | 3/2005 |
| JP | A-06-186526 | 7/1994 |

(Continued)

OTHER PUBLICATIONS

May 22, 2012 Office Action issued in Japanese Patent Application No. 2007-524048 (partial translation).

*Primary Examiner* — Ryan R Yang
(74) *Attorney, Agent, or Firm* — Oliff PLC

(57) ABSTRACT

An object of the invention is to provide a display device having a display section that displays different images intended for a plurality of different viewing ranges on the same screen, wherein provisions are made so that the image intended for at least one viewing range can be viewed in good condition, and a method for mounting such a display device. More specifically, a display device according to the invention includes a display section that displays different images intended for a plurality of different viewing ranges on the same screen, wherein the viewing range of at least one of the different images displayed on the display section is not narrower than 20°, but not wider than 40°.

20 Claims, 15 Drawing Sheets

(56) References Cited

U.S. PATENT DOCUMENTS

| | | | |
|---|---|---|---|
| 6,437,915 B2 | 8/2002 | Moseley et al. | |
| 6,624,863 B1 | 9/2003 | Jacobs et al. | |
| 7,518,664 B2 * | 4/2009 | Mather et al. | 349/15 |
| 7,580,186 B2 * | 8/2009 | Mather et al. | 359/463 |
| 7,635,586 B2 * | 12/2009 | West | 435/286.1 |
| 2004/0218245 A1 * | 11/2004 | Kean et al. | 359/232 |
| 2005/0111100 A1 * | 5/2005 | Mather et al. | 359/464 |

FOREIGN PATENT DOCUMENTS

| | | |
|---|---|---|
| JP | A-06-236152 | 8/1994 |
| JP | A-09-046622 | 2/1997 |
| JP | A-11-331876 | 11/1999 |
| JP | A-2000-036927 | 2/2000 |
| JP | A-2000-137443 | 5/2000 |
| JP | A-2003-084681 | 3/2003 |
| JP | A-2003-137005 | 5/2003 |
| JP | A-2004-233816 | 8/2004 |
| JP | A-2005-071286 | 3/2005 |
| JP | A-2005-073076 | 3/2005 |
| JP | A-2005-077688 | 3/2005 |
| JP | A-2005-078076 | 3/2005 |
| JP | A-2005-078092 | 3/2005 |
| JP | A-2005-284592 | 10/2005 |
| WO | WO 2004/016460 A1 | 2/2004 |

* cited by examiner

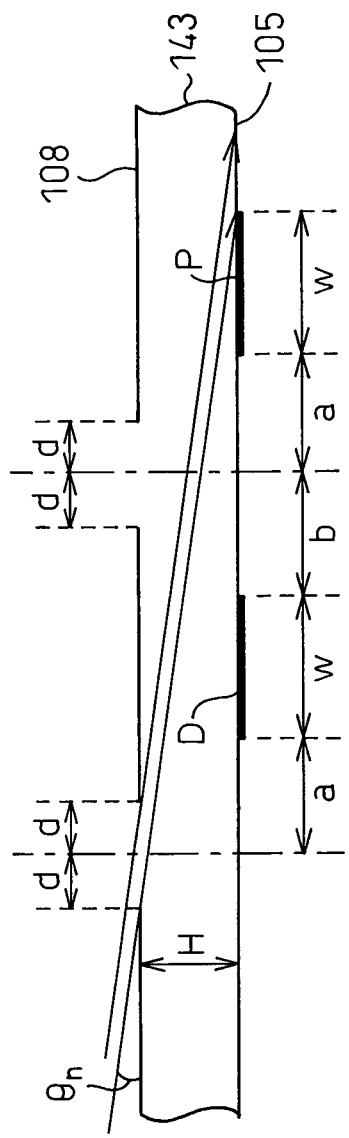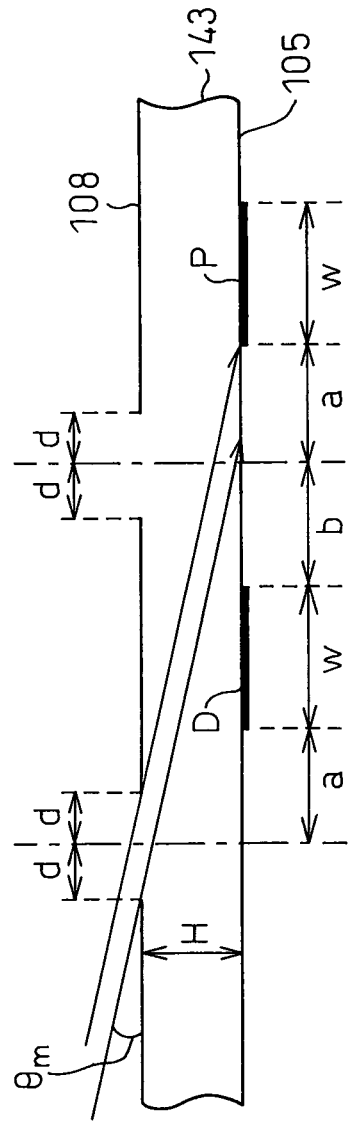

DISPLAY DEVICE AND METHOD FOR MOUNTING THE SAME

FIELD OF THE INVENTION

The present invention relates to a display device that can display different kinds of content on the same display screen from different viewing directions, and a method for mounting such a display device.

BACKGROUND OF THE INVENTION

It is known to provide a display device (hereinafter called a "multi-view capable display device") that can display different kinds of content on the same display screen that can be viewed from at least two different directions, for example, from a driver's side and passenger's side (refer, for example, to patent document 1).

When using such a multi-view capable display device for automotive application, images displayed on the display screen are split into a large number of vertical strips to provide a right view display and a left view display, and an image intended for the driver is displayed on the right view display and an image for the passenger is displayed on the left view display. This enables different images to be viewed from the driver's side and the passenger's side, respectively.

Patent document 1: Japanese Unexamined Patent Publication No. 2005-73076

SUMMARY OF THE INVENTION

A display device that can display different kinds of content on the same display screen for viewing from different directions presents two different images one intended for the driver and the other for the passenger. However, there is an area where the two images are simultaneously visible with one overlapping the other (hereinafter referred to as the "crosstalk area") depending on the angle from which the viewer views the display screen (hereinafter referred to as the "angle of viewing").

Accordingly, it is an object of the present invention to provide a display device having a display section that displays different images intended for a plurality of different viewing ranges on the same screen, wherein provisions are made so that the image intended for at least one viewing range can be observed well, and a method for mounting such a display device.

It is also an object of the present invention to provide a display device having a display section that displays different images intended for a plurality of different viewing ranges on the same screen, wherein provisions are made so that the respective images can be viewed in good condition from the driver's side and the passenger's side, respectively, and a method for mounting such a display device.

To solve the above problem, according to the present invention, there is provided a display device which includes a display section that displays different images intended for a plurality of different viewing ranges on the same screen, wherein the viewing range of at least one of the different images displayed on the display section is not narrower than 20°, but not wider than 40°.

To solve the above problem, according to the present invention, there is provided a method for mounting a display device having a display section that displays different images intended for a plurality of different viewing ranges on the same screen, and that provides a first viewing range within which one of the different images is viewable and a second viewing range within which at least two of the different images are simultaneously visible with one overlapping the other, the method includes a step of mounting the display device forward of a position between two seats inside a vehicle in such a manner that the second viewing range is located between the two seats.

To solve the above problem, according to the present invention, there is also provided a method for mounting a display device having a display section that displays different images intended for a plurality of different viewing ranges on the same screen, the method includes a step of mounting the display device forward of a position between two seats inside a vehicle in such a manner that one of the plurality of different viewing ranges covers at least a range not smaller than 45°, but not larger than 65° in terms of an angle relative to a reference plane defined at one longitudinal end of the display section and that another one of the plurality of different viewing ranges covers at least a range not smaller than 115°, but not larger than 135° in terms of an angle relative to the reference plane.

According to the display device of the present invention, since the viewing range of at least one of the different images is not narrower than 20°, but not wider than 40°, the different images can be viewed in good condition from the driver' side and the passenger's side, respectively.

According to the display device mounting method of the present invention, since the display device is mounted relative to the seats in such a manner that the respective viewing ranges cover respectively specified ranges, the different images can be viewed in good condition from the driver' side and the passenger's side, respectively.

BRIEF DESCRIPTION OF THE DRAWINGS

FIG. 17(a) is a diagram showing the relationship between second-order crosstalk and the parallax barrier when the angle of viewing is θn, and FIG. 17(b) is a diagram showing the relationship between second-order crosstalk and the parallax barrier when the angle of viewing is θm.

DESCRIPTION OF THE PREFERRED EMBODIMENTS

A display device and a method for mounting the display device according to the present invention will be described below with reference to the drawings. However, it should be noted that the display device and the method for mounting the display device according to the present invention is not limited by the description given herein, but can be embodied in a variety of forms without departing from the technical scope of the present invention.

The various embodiments of the present invention will be described below with reference to the drawings. However, it is to be understood that the scope of the invention is not limited by the specific embodiments described herein, but should be defined by the appended claims and their equivalents.

Figure 1:
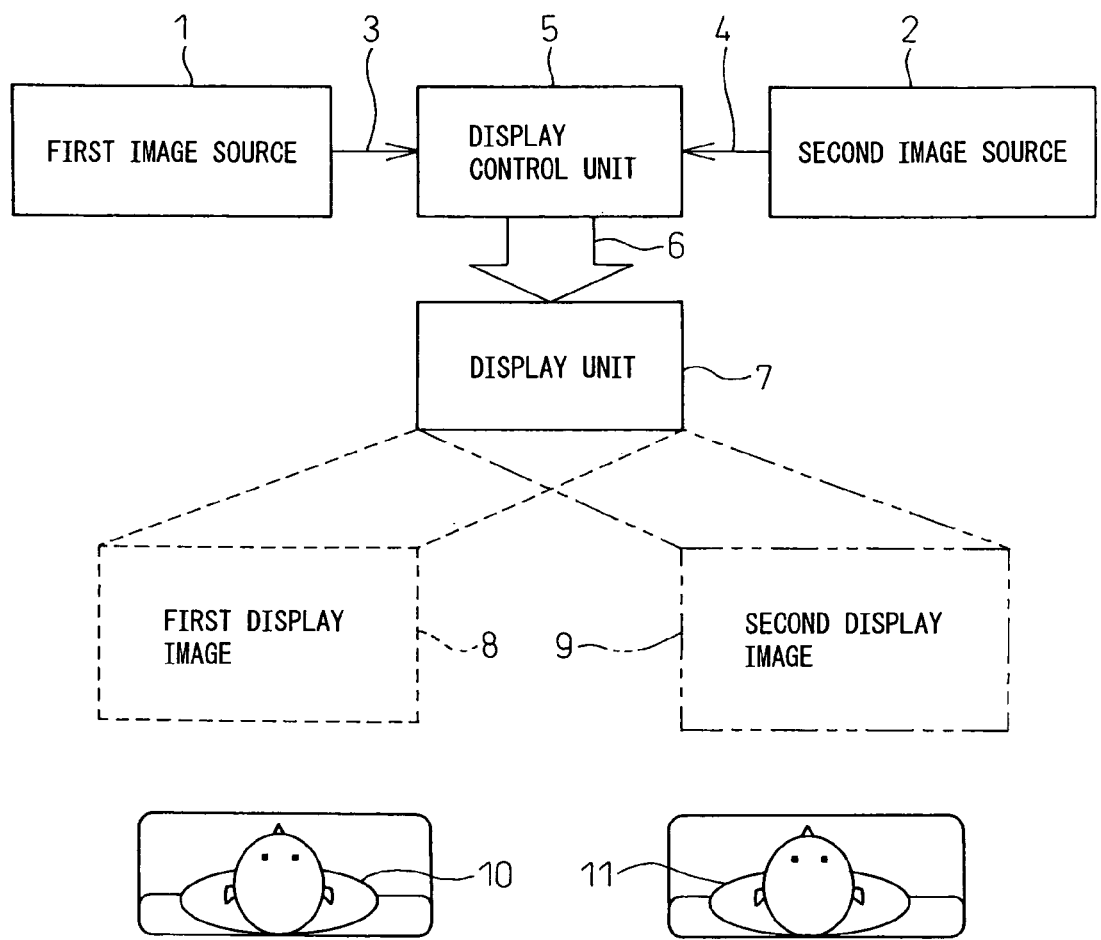
FIG. 1 is a conceptual diagram showing a display device according to the present invention.

FIG. 1 is a conceptual diagram showing the display device according to the present invention. In the figure, reference numeral 1 is a first image source, 2 is a second image source, 3 is first image data from the first image source, 4 is second image data from the second image source, 5 is a display control unit, 6 is display data, 7 is a display unit (constructed, for example, from a liquid crystal panel or the like), 8 is a first display image based on the first image source 1, 9 is a second display image based on the second image source 2, 10 is an observer (user) located to the left relative to display unit 7, and 11 is an observer (user) located to the right relative to the display unit 7.

The diagram of FIG. 1 conceptually shows that first display image 8 and second display image 9 can in effect be displayed simultaneously on the display unit 7 in such a manner that observers 10 and 11 can see the first and second display images 8 and 9, respectively, and independently of each other, according to the positions of observers 10 and 11 relative to display unit 7, or according to their angles of viewing relative to display unit 7, and also that the respective display images 8 and 9 can each be viewed over the entire display screen of display unit 7. In FIG. 1, the first image source 1 is, for example, a movie image reproduced by a DVD player or a television image from a television receiver, and the second image source 2 is, for example, a map or a route guidance image from a car navigation system; the first and second image data 3 and 4 representing the respective images are supplied to display control unit 5 where the display data is processed so that the respective images can in effect be displayed simultaneously on display unit 7.

The display unit 7 to which the display control unit 5 supplies the display data 6 is constructed from a liquid crystal panel or the like provided with a parallax barrier which will be described later. Half of the total number of pixels as counted horizontally across the display unit 7 is used for displaying the first display image 8 based on the first image source 1, and the remaining half is used for displaying the second display image 9 based on the second image source 2. Only the pixels corresponding to the first display image 8 are visible to the observer 10 located to the left relative to the display unit 7, and the second display image 9 is substantially invisible as it is blocked by the parallax barrier formed on the surface of the display unit 7. On the other hand, only the pixels corresponding to the second display image 9 are visible to the observer 11 located to the right relative to the display unit 7, and the first display image 8 is substantially invisible as it is blocked by the parallax barrier.

With the above structure, different kinds of information or different kinds of content can be presented for viewing on the same screen to the left and right users, respectively. If the first and second images sources are the same, the same image can be presented for viewing to both the left and right users, as in a conventional system.

Figure 2:
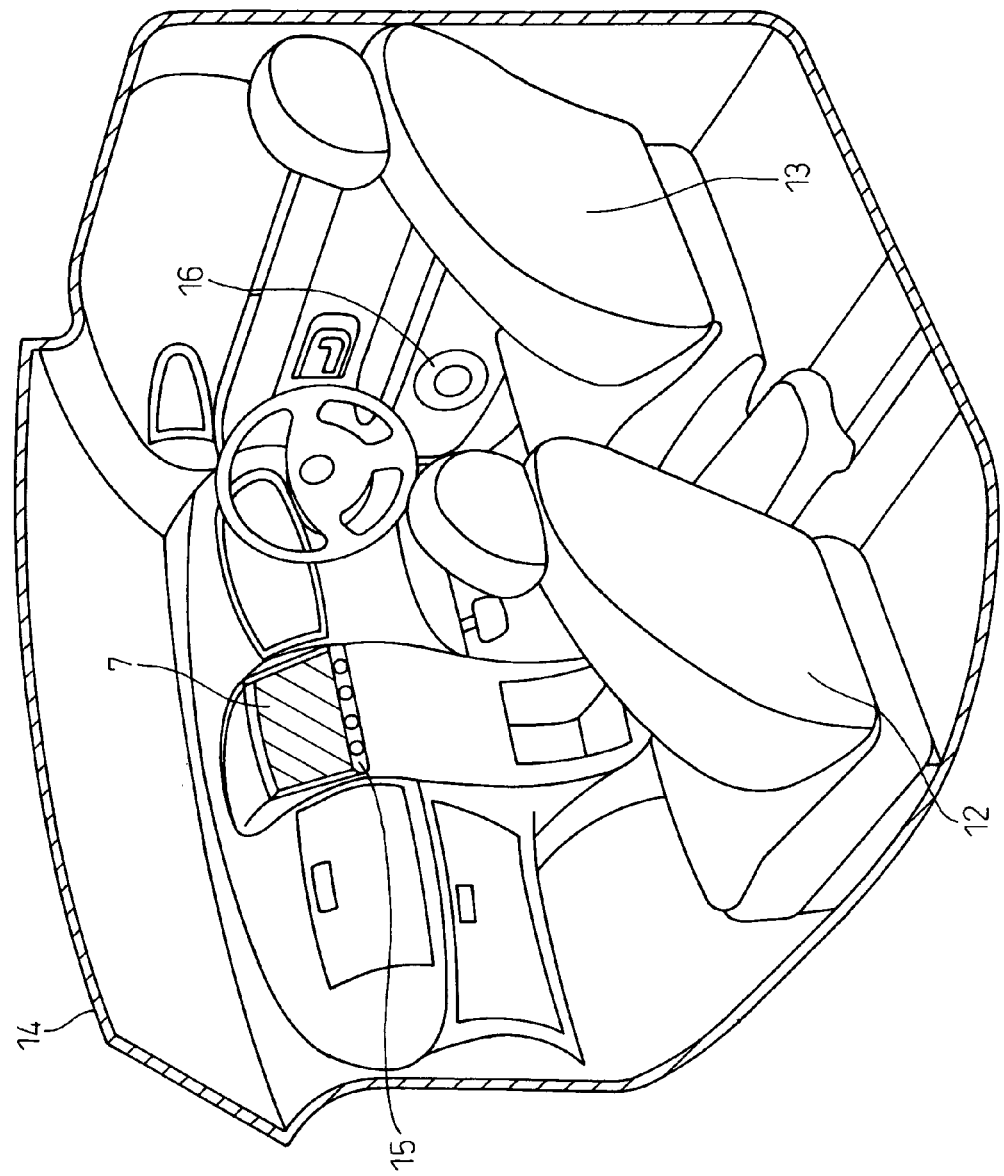
FIG. 2 is a perspective view showing a mounting example of the display device.

FIG. 2 is a perspective view showing an example of how the multi-view display device according to the present invention is mounted in a vehicle. In the figure, reference numeral 12 is an passenger's seat, 13 is a driver's seat, 14 is a windshield, 15 is an operating unit, and 16 is a speaker.

The display unit 7 of the multi-view display device of FIG. 1 is mounted in the dashboard portion located substantially centered between the driver's seat 13 and the assistance driver's seat 12, for example, as shown in FIG. 2. Various operations to the multi-view display device are performed by operating a touch panel (not shown) integrally formed on the surface of the display unit 7 or by operating the operating unit 15 or an infrared or wireless remote controller (not shown). The speaker 16, which is mounted in each door of the vehicle, outputs a sound accompanying the displayed image or an alarm sound or the like.

Observer 11 in FIG. 1 is seated in driver's seat 13, while observer 10 is seated in the passenger's seat. The image that can be seen from a first viewing direction relative to the display unit 7 (i.e., from the driver's seat side) is, for example, an image such as a map from a car navigation system, and the image that can in effect be seen from a second viewing direction (i.e., from the passenger's seat side) at the same time is, for example, a television image or a DVD movie image. Accordingly, while the driver in the driver's seat 13 is being assisted by the car navigation system, the occupant in the passenger's seat 12 can watch television or DVD content. Furthermore, since each image is displayed over the entire display area of, for example, a 7-inch screen, the screen need not be split into smaller areas for displaying the respective images as in a conventional multi-window type display. In other words, information or content suitable for the driver and the passenger, respectively, can be presented for viewing independently of each other and simultaneously on the same screen as if a dedicated display unit were provided for each occupant.

Figure 3:
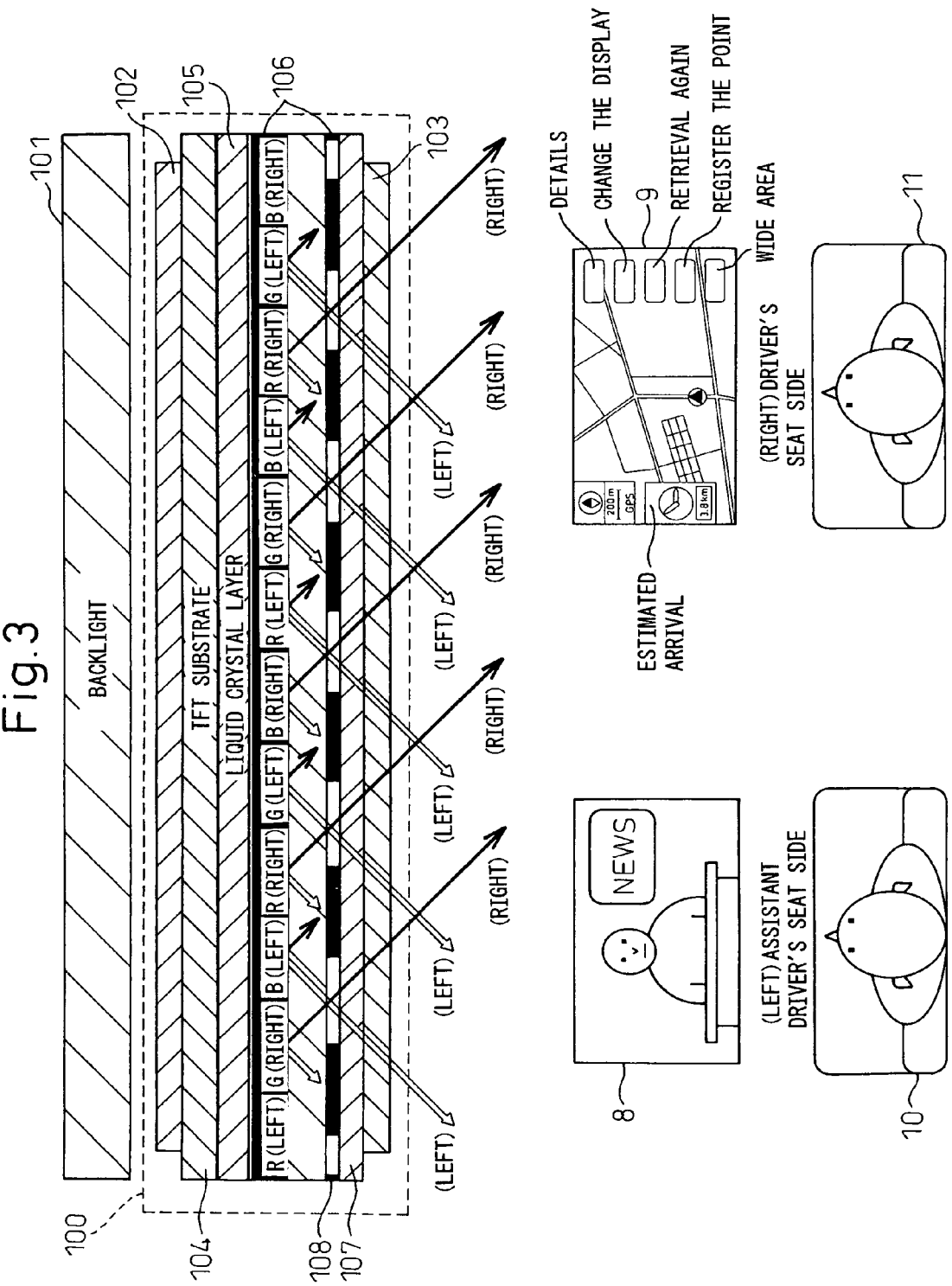
FIG. 3 is a diagram schematically showing the cross-sectional structure of a display unit.

FIG. 3 is a diagram schematically showing the cross-sectional structure of the display unit 7. In the figure, reference numeral 100 is a liquid crystal panel, 101 is a backlight, 102 is a polarizer disposed on the backlight side of the liquid crystal panel, 103 is a polarizer disposed on the light-emerging front side of the liquid crystal panel, 104 is a TFT (Thin Film Transistor) substrate, 105 is a liquid crystal layer, 106 is a color filter substrate, 107 is a glass substrate, and 108 is a parallax barrier. The liquid crystal panel 100 is constructed by sandwiching the liquid crystal layer 105 between the pair of substrates, i.e., the TFT substrate 104 and the opposing color filter substrate 106, and further sandwiching the pair of substrates and the parallax barrier 108 and glass substrate 107 disposed on the light-emerging front side thereof between the two polarizers 102 and 103. The liquid crystal panel 100 is spaced a certain distance away from the backlight 101. Further, the liquid crystal panel 100 contains pixels of RGB colors (three primary colors).

The pixels in the liquid crystal panel 100 are controlled for display by being divided between the pixels for the left-side (passenger's seat side) display and the pixels for the right-side (driver's seat side) display. The pixels for the left-side (passenger's seat side) display are visible from the left side (the passenger's seat side), but are not visible from the right side (the driver's seat side) as the display is blocked by the parallax barrier 108. Likewise, the pixels for the right-side (driver's seat side) display are visible from the right side (the driver's seat side), but are not visible from the left side (the passenger's seat side) as the display is blocked by the parallax barrier 108. In this way, different images can be presented, for example, to the driver 11 and the passenger 10, respectively. In other words, navigation map information 9 can be presented for viewing to the driver 11, and at the same time, DVD content 8 or can be presented for viewing to the passenger 10. It is also possible to present different images in three or more directions by modifying the structure of the parallax barrier and the arrangement of the pixels in the liquid crystal panel. Furthermore, the viewing angle may be made variable by constructing the parallax barrier from a liquid crystal shutter or the like that can be electrically driven.

Figure 4:
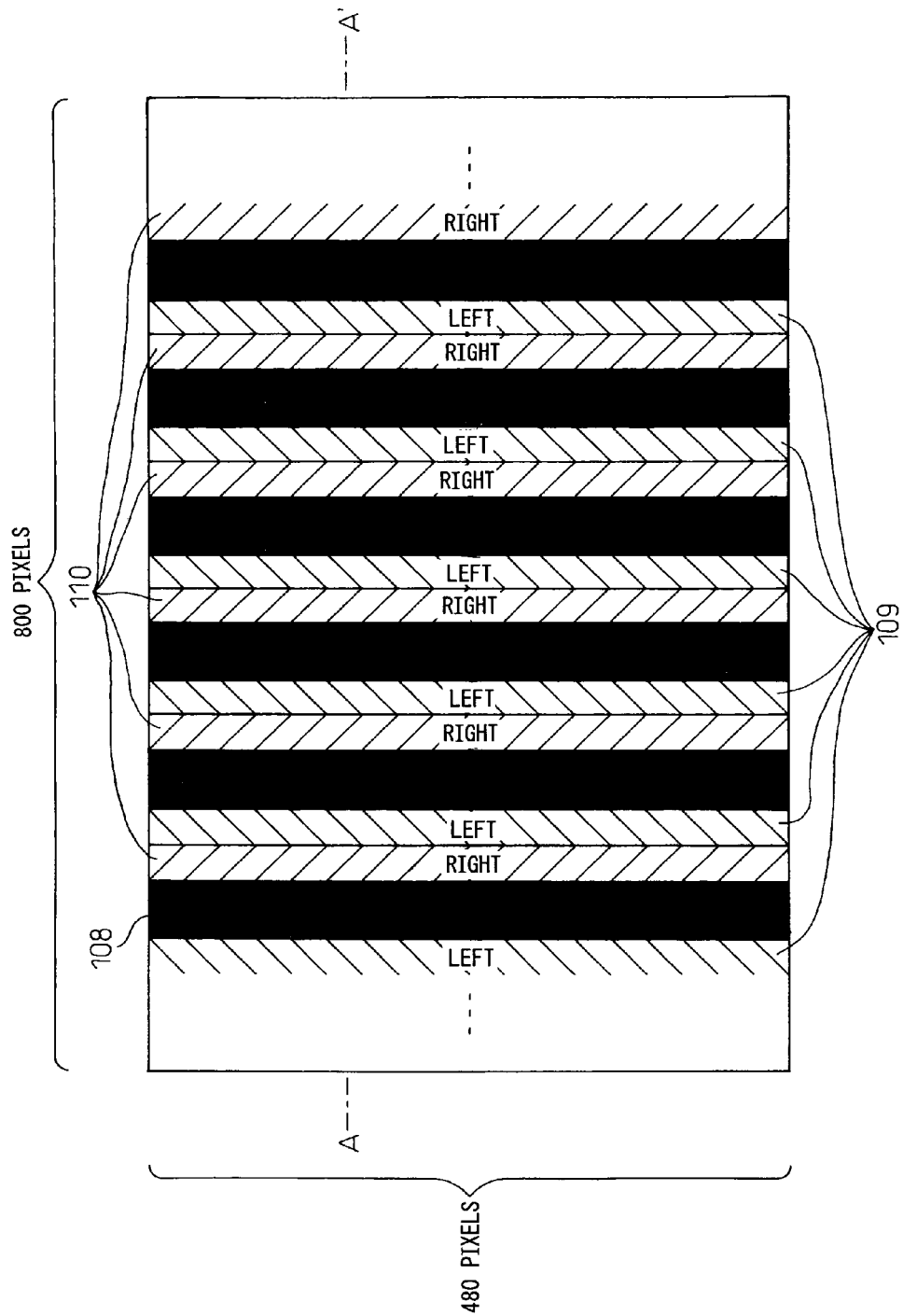
FIG. 4 is a diagram schematically showing the structure of a display panel as viewed from the front side thereof.

FIG. 4 is a diagram schematically showing the structure of the display panel as viewed from the front side thereof, and FIG. 3 is a cross-sectional view taken along A-A' in FIG. 4. In the figure, reference numeral 109 represents the pixels for the left-side (passenger's seat side) display, and 110 the pixels for the right-side (driver's seat side) display. FIGS. 3 and 4 show a portion of the liquid crystal panel 100 having, for example, 800 pixels horizontally and 480 pixels vertically. The pixels 109 for the left-side (passenger's seat side) display and the pixels 110 for the right-side (driver's seat side) display are respectively grouped as columns of pixels and are arranged in alternating fashion. The parallax barriers are arranged side by side along the horizontal direction, one spaced a certain distance away from another, and each extending vertically with a uniform thickness. Accordingly, when the display panel is viewed from the left side, the right-side pixels 110 are hidden behind the parallax barriers 108, and only the left-side pixels 109 are visible. Likewise, when it is viewed from the right side, the left-side pixels 109 are hidden behind the parallax barriers 108, and only the right-side pixels 110 are visible. On the other hand, when the display panel is viewed straight on, both the left-side pixels 109 and the right-side pixels 110 are visible, so that the left-side display image and the right-side display image are seen with one substantially overlapping the other. The left-side pixels 109 and the right-side pixels 110 arranged in alternating fashion in FIG. 4 have RGB colors as shown in FIG. 3, in which each column of pixels may consist of pixels of the same color, such as R-color pixels, G-color pixels, or B-color pixels, or of different RGB colors.

Figure 5:
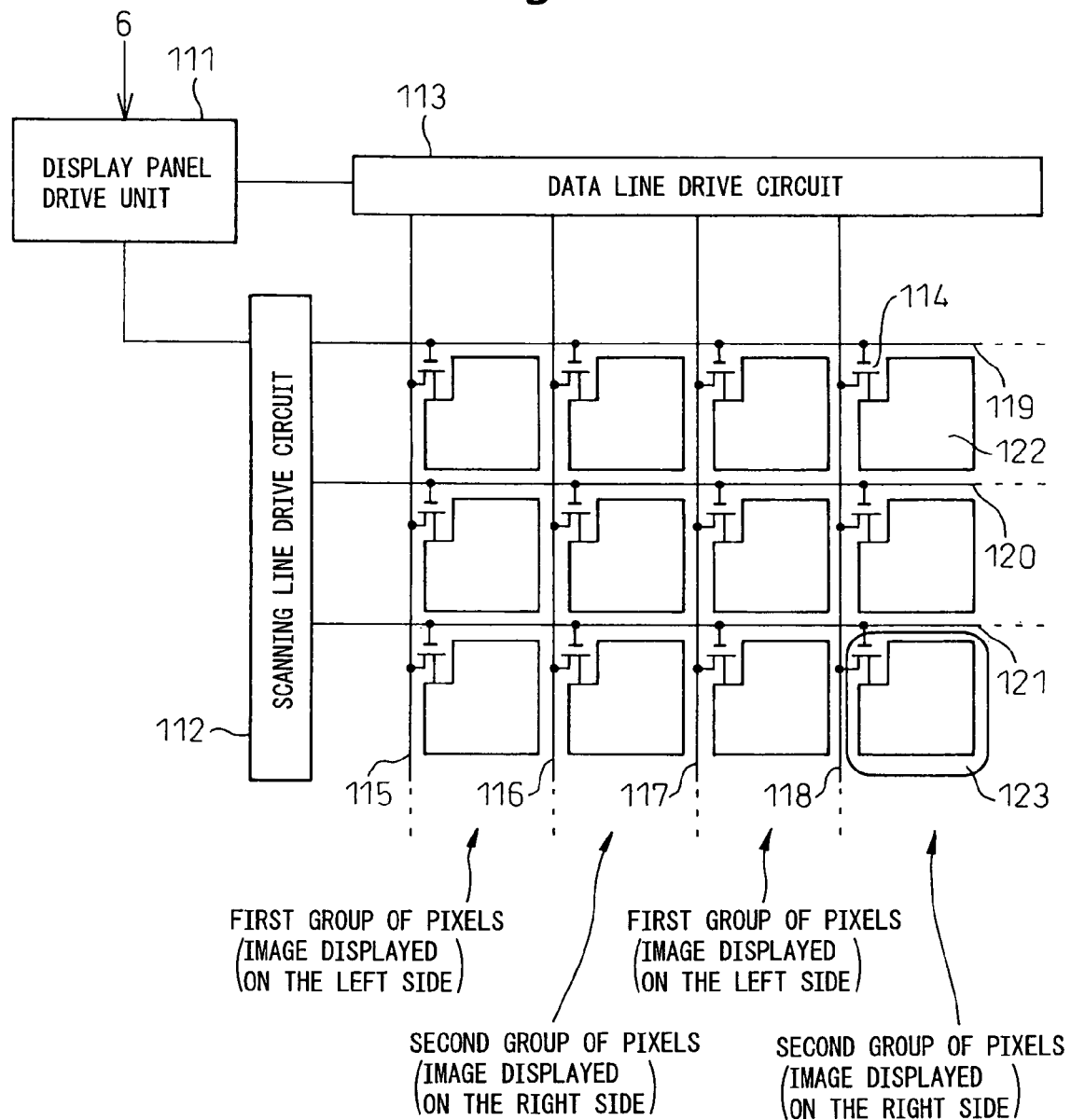
FIG. 5 is a circuit diagram schematically showing a TFT substrate.

FIG. 5 is a circuit diagram schematically showing the TFT substrate 104. Reference numeral 111 is a display panel drive unit, 112 is a scanning line drive circuit, 113 is a data line drive circuit, 114 is a TFT device, 115 to 118 are data lines, 119 to 121 are scanning lines, 122 is a pixel electrode, and 123 is a sub-pixel. As shown in FIG. 5, the sub-pixel is formed in a region enclosed by corresponding ones of the data lines 115 to 118 and corresponding ones of the scanning lines 119 to 121, and a plurality of such sub-pixels are formed. The pixel electrode 122 for applying a voltage to the liquid crystal layer 105 and the TFT device for controlling the switching thereof are formed within each sub-pixel. The display panel drive unit 111 controls the driving timing of the scanning line drive circuit 112 and the data line drive circuit 113. The scanning line drive circuit 112 selects the respective TFT devices 114 by scanning, while the data line drive circuit 113 controls the voltage applied to each pixel electrode 122.

The plurality of sub-pixels are divided into two groups, the first group of pixels for displaying the first image and the second group of pixels for displaying the second image, and the respective images are displayed by applying the first pixel data (for the left-side image display), for example, to the data lines 115 and 117 and the second pixel data (for the right-side image display) to the data lines 116 and 118, based on the combined data of the first and second image data or on the independent first and second image data.

Figure 6:
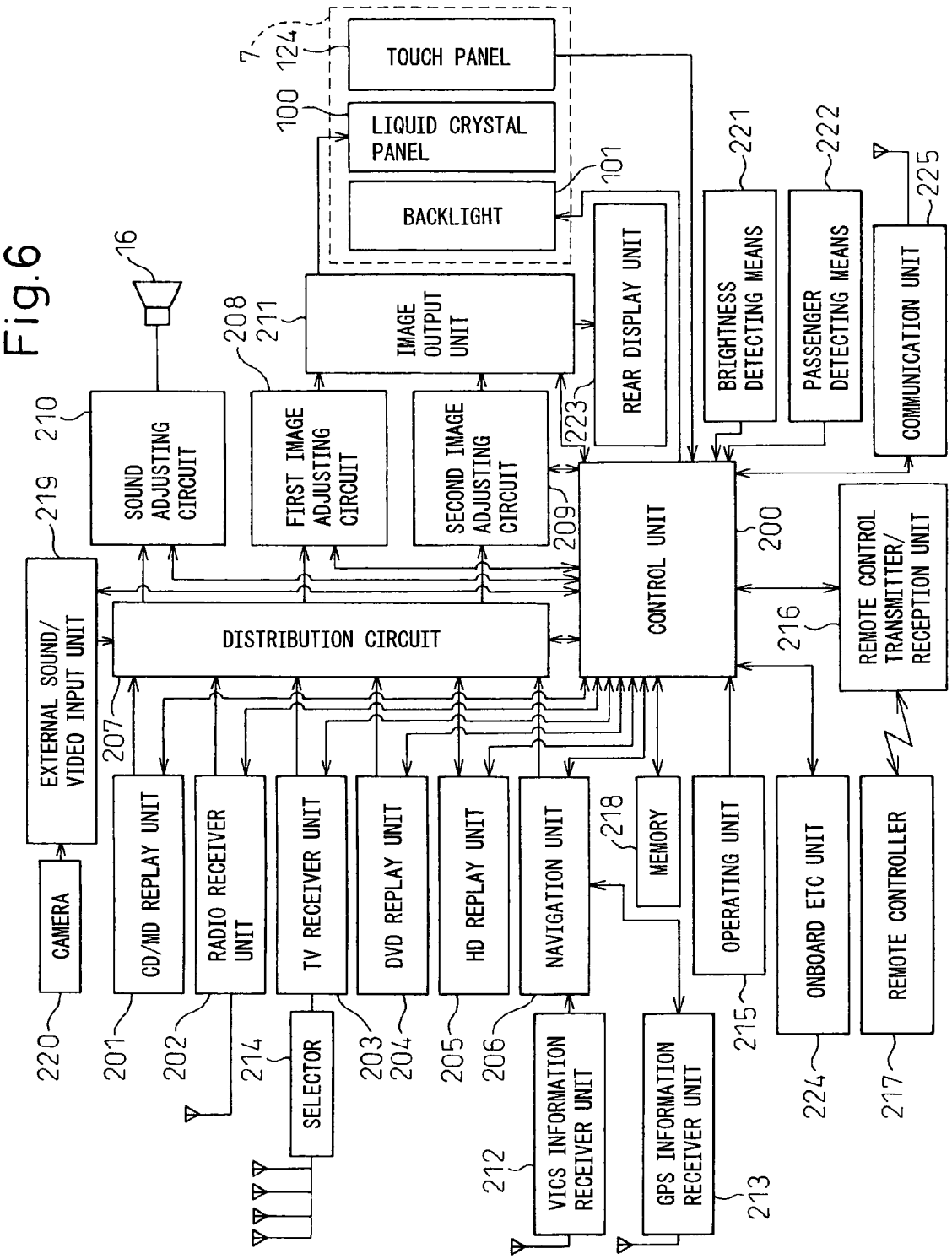
FIG. 6 is a block diagram schematically showing the display device according to the present invention.

FIG. 6 is a block diagram schematically showing the display device according to the present invention as applied to a so-called audio visual navigation combination system. In the figure, reference numeral 124 is a touch panel, 200 is a control unit, 201 is a CD/MD replay unit, 202 is a radio receiver unit, 203 is a TV receiver unit, 204 is a DVD replay unit, 205 is a HD (Hard Disk) replay unit, 206 is a navigation unit, 207 is a distribution circuit, 208 is a first image adjusting circuit, 209 is a second image adjusting circuit, 210 is a sound adjusting circuit, 211 is an image output unit, 212 is a VICS information receiver unit, 213 is a GPS information receiver unit, 214 is a selector, 215 is an operating unit, 216 is a remote control transmitter/reception unit, 217 is a remote controller, 218 is a memory, 219 is an external sound/video input unit, 220 is a camera, 221 is a brightness detecting means, 222 is a passenger detecting means, 223 is a rear display unit, 224 is an onboard ETC unit, and 225 is a communication unit.

The touch panel 124, the liquid crystal panel 100, and the backlight 101 together constitute the display unit 7. As earlier described, the liquid crystal panel 100 of the display unit 7 can, in effect, simultaneously display an image to be viewed from the first viewing direction, i.e., the driver's seat side, and an image to be viewed from the second viewing direction, i.e., the passenger's seat side. For the display unit 7, a flat panel display other than the liquid crystal panel may be used, examples including an organic EL display panel, a plasma display panel, and a cold-cathode flat panel display.

Under instructions from the control unit 200, sound and video from various sources (CD/MD unit 201, radio receiver unit 202, TV receiver unit 203, DVD unit 204, HD unit 205, and navigation unit 206) are distributed to the appropriate circuits via the distribution circuit 207 which distributes the image source designated for the left view to the first image adjusting circuit 208 and the image source designated for the right view to the second image adjusting circuit 209; more specifically, video is distributed to the first and second image adjusting circuits 208 and 209, and sound is distributed to the sound adjusting circuit 210. The first and second image adjusting circuits 208 and 209 adjust brightness, color tone, contrast, etc., and the image output unit 211 outputs the thus adjusted images to the display unit 7 for display. The sound adjusting circuit 210 adjusts the distribution of the sound between the speakers, as well as the sound volume, tone, etc. and the thus adjusted sound is output from the speaker 16. The rear display unit 223 is a display unit for the rear seats, and can display the same images as those being displayed on the display unit 7 or either the image being presented to the driver's seat side or the image being presented to the assistant driver's side.

Figure 7:
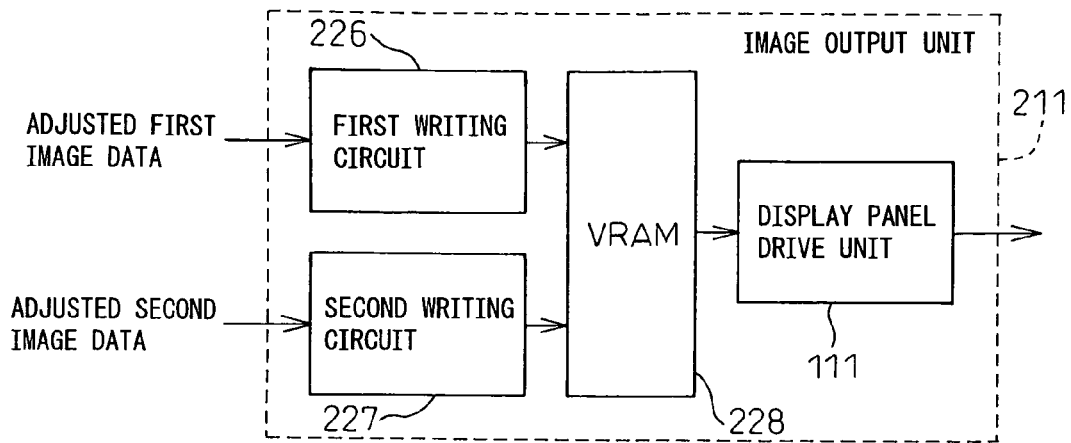
FIG. 7 is a block diagram schematically showing an image output unit 211.

FIG. 7 is a block diagram schematically showing the image output unit 211. In the figure, reference numeral 226 is a first writing circuit, 227 is a second writing circuit, and 228 is a VRAM (Video RAM).

The image output unit 211 comprises, for example, as shown in FIG. 7, the first writing circuit 226, the second writing circuit 227, the VRAM (Video RAM) 228, and the display panel drive unit 111. For example, the first writing circuit 226 writes the adjusted image data output from the circuit 208 and corresponding to the odd-numbered columns (in other words, the image data for the first display image 8 in FIG. 1) into a designated area in the VRAM 228, while the second writing circuit 227 writes the adjusted image data output from the circuit 209 and corresponding to the even-numbered columns (in other words, the image data for the second display image 9 in FIG. 1) into a designated area in the VRAM 228. The display panel drive unit 111 is a circuit for driving the liquid crystal panel 100, and drives the corresponding pixels in the liquid crystal panel 100 based on the image data (combined data of the first and second image data) held in the VRAM 228. Here, since the image data are written to the VRAM 228 so that multi-view display images can be generated from the combined data of the first and second image data, only one drive circuit suffices for the purpose, and its operation is the same as that of the drive circuit for the conventional liquid crystal display. As an alternative configuration, a first display panel drive circuit and a second display panel drive circuit may be provided which respectively drive the corresponding pixels in the liquid crystal panel 100 based on the respective image data without combining the first and second image data.

To describe one example of the various sources shown in FIG. 6, when the HD replay unit 205 is selected, music data such as an MP3 file, image data such as a JPEG file, map data for navigation, etc., are read out from the hard disk (HD), and a menu for selecting music titles or the readout image data can be displayed on the display unit 7.

The navigation unit 206, which is equipped with a map information storage unit for storing map information to be used for navigation, can acquire information from the VICS information receiver unit 212 and GPS information receiver unit 213, create images for navigation, and display the images. The TV receiver unit 203 receives analog or digital TV broadcast waves via an antenna and via the selector 214.

Figure 8:
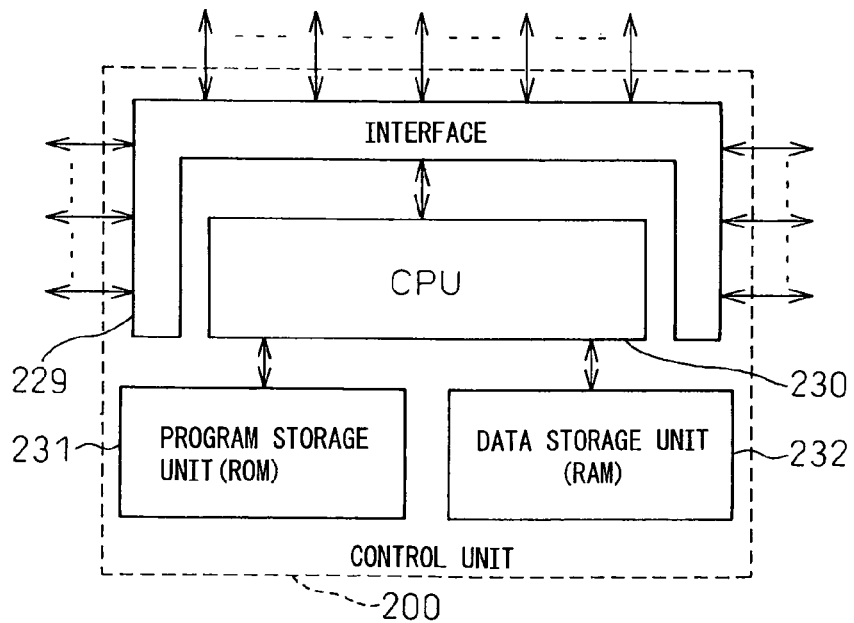
FIG. 8 is a block diagram schematically showing a control unit 200.

FIG. 8 is a block diagram schematically showing the control unit 200. In the figure, reference numeral 229 is an interface, 230 is a CPU, 213 is a program storage unit, and 232 is a data storage unit.

The control unit 200 controls the distribution circuit 207 and various sources so as to display two or one selected source. The control unit 200 also performs control so that an operation menu for controlling the various sources is displayed on the display unit 7. As shown in FIG. 8, the control unit 200 is constructed from a microprocessor or the like, and includes the CPU 230 which centrally controls the various parts and circuits provided in the display device. The CPU 230 contains the program storage unit 231 constructed from a ROM for storing various programs necessary for operating the display device, and the data storage unit 232 constructed from a RAM for storing various kinds of data. Here, the ROM and RAM may be internal or external to the CPU. The ROM may be an electrically alterable nonvolatile memory such as a flash memory.

The user can control the various sources by operating the touch panel 124 formed on the surface of the display unit 7 or switches provided around the periphery of the display unit 7, or by performing voice-activated input or selection operations on the operating unit 215. Input or selection operations may also be performed via the remote control transmitter/receiver unit 216 by using the remote controller 217. The control unit 200 controls the various sources and circuits in accordance with the operations performed on the touch panel 124 or the operating unit 215.

Further, the control unit 200 is constructed to be able to control the sound volume, etc., of the speaker 16 by using the sound adjusting circuit 210, a plurality of such speakers being mounted in the vehicle as shown in FIG. 2. The control unit 200 also performs control to store various kinds of setting information, such as image quality setting information, programs, and vehicle information, into the memory 218.

Further, the control unit 200 may be constructed to perform control so that an image, for example, from the rear monitoring camera 220 connected to the external sound/video input unit 219 is displayed on the display unit 7. Besides the rear monitoring camera 220, a video camera, a game machine, etc., may be connected to the external sound/video input unit 219.

Further, the control unit 200 can perform control to change the settings for sound localization, etc., based on the information detected by the brightness detecting means 221 (for example, a vehicle light switch or light sensor) or the occupant detecting means 222 (for example, a pressure sensor mounted in the driver's seat or the passenger's seat).

The control unit 200 also performs control to produce a toll display based on the tolls detected by the onboard ETC unit 224. Further, the control unit 200 controls the communication unit 225 for connecting to a mobile phone or the like via a wireless link. Here, control may be performed to display the related information on the display unit 7.

Figure 9:
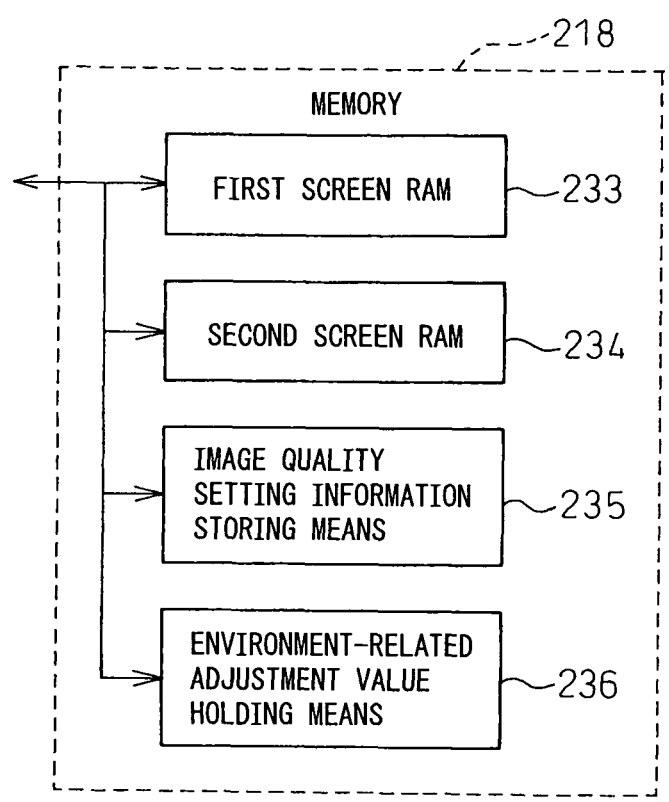
FIG. 9 is a block diagram schematically showing a memory 218.

FIG. 9 is a block diagram schematically showing the memory 218. In the figure, reference numeral 233 is a first screen RAM, 234 is a second screen RAM, 235 is an image quality setting information storing means, and 236 is an environment-related adjustment value holding means.

The memory 218 includes, for example, as shown in FIG. 9, the first and second screen RAM 233 and 234 to which user-set image quality adjustment values for the first and second images, respectively, can be written. It also includes the image quality setting information storing means 235 in which a plurality of incremental image quality adjustment values for image quality adjustment are prestored as preset values that can be read out when adjusting the image quality of the first and second images. It further includes the environment-related adjustment value holding means 236 in which adjustment values for adjusting the image quality of the first and second images in accordance with the surrounding environment are held in order to adjust the image quality in response to changes in the surrounding environment such as changes in brightness outside the vehicle. The image quality setting information storing means 235 and the environment-related adjustment value holding means 236 are each constructed from an electrically alterable nonvolatile memory such as a flash memory or a battery-backed volatile memory.

Figure 10:
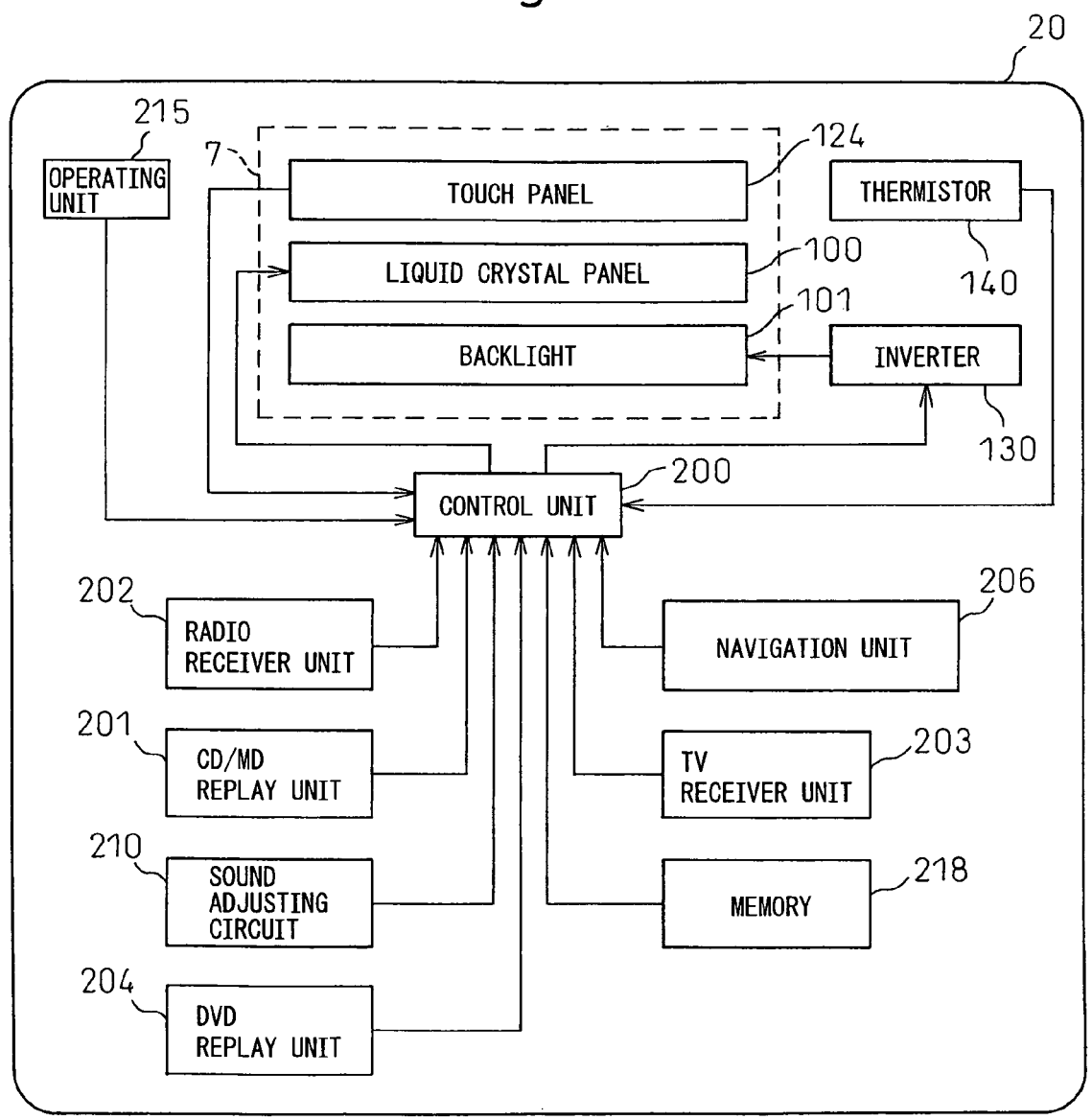
FIG. 10 is a block diagram schematically showing the configuration of the display device according to the present invention.

FIG. 10 is a block diagram showing the parts that characterize the display device.

The display device 20 is a multifunction device comprising: liquid crystal panel 100; backlight 101 having two cold-cathode tubes; inverter 130 for supplying a prescribed alternating current to the backlight 101; thermistor 140 for measuring the temperature near the backlight 101; touch panel 124 provided on the surface of the liquid crystal panel 100 functioning as a display panel, and used to perform various input operations; operating unit 215 provided around the periphery of the display unit 7 and having a plurality of buttons; control unit 200 comprising CPU, RAM, ROM, etc.; radio receiver unit 202; CD/MD replay unit 201; DVD replay unit 204; sound adjusting output circuit 210 for producing outputs to the plurality of speakers mounted in the vehicle; navigation unit 206; TV receiver unit 203; and memory 218. The liquid crystal panel 100, the backlight 101, and the touch panel 124 together function as the display unit 7. The navigation unit 206 includes the VICS information receiver unit, GPS information receiver unit, gyro sensor, vehicle speed pulse detector, etc. in addition to the map information storage unit for storing map information to be used for navigation and, using various kinds of data, the navigation unit 206 creates and outputs images for navigation which are displayed on the liquid crystal panel 100 under the control of the control unit 200.

The liquid crystal panel 100 contains a plurality of pixels divided into groups of strip-like pixel columns extending in the vertical direction of the liquid crystal panel 100, forming a first pixel group consisting of a plurality of pixels for displaying an image intended for the passenger's seat occupant and a second pixel group consisting of a plurality of pixels for displaying an image intended for the driver's seat occupant, the first and second pixel groups being arranged in alternating fashion.

The control unit 200 performs control so that the first display image from a selected one of the various sources (CD/MD replay unit 201, TV receiver unit 203, DVD replay unit 204, and navigation unit 206) is displayed for the passenger's seat occupant by driving the first pixel group, while the second display image from a selected one of the various sources is displayed for the driver's seat occupant by driving the second pixel group. Here, the first and second display images may be separate images (for example, a navigation image for the driver's seat occupant and a DVD image for the passenger's seat occupant) or may be the same image. It is also preferable to make provisions so that the images to be presented to the respective sides can be selected by using the operating unit 215. Further, the first and second display images can include all possible kinds of digital images including still images and moving images.

Figure 11:
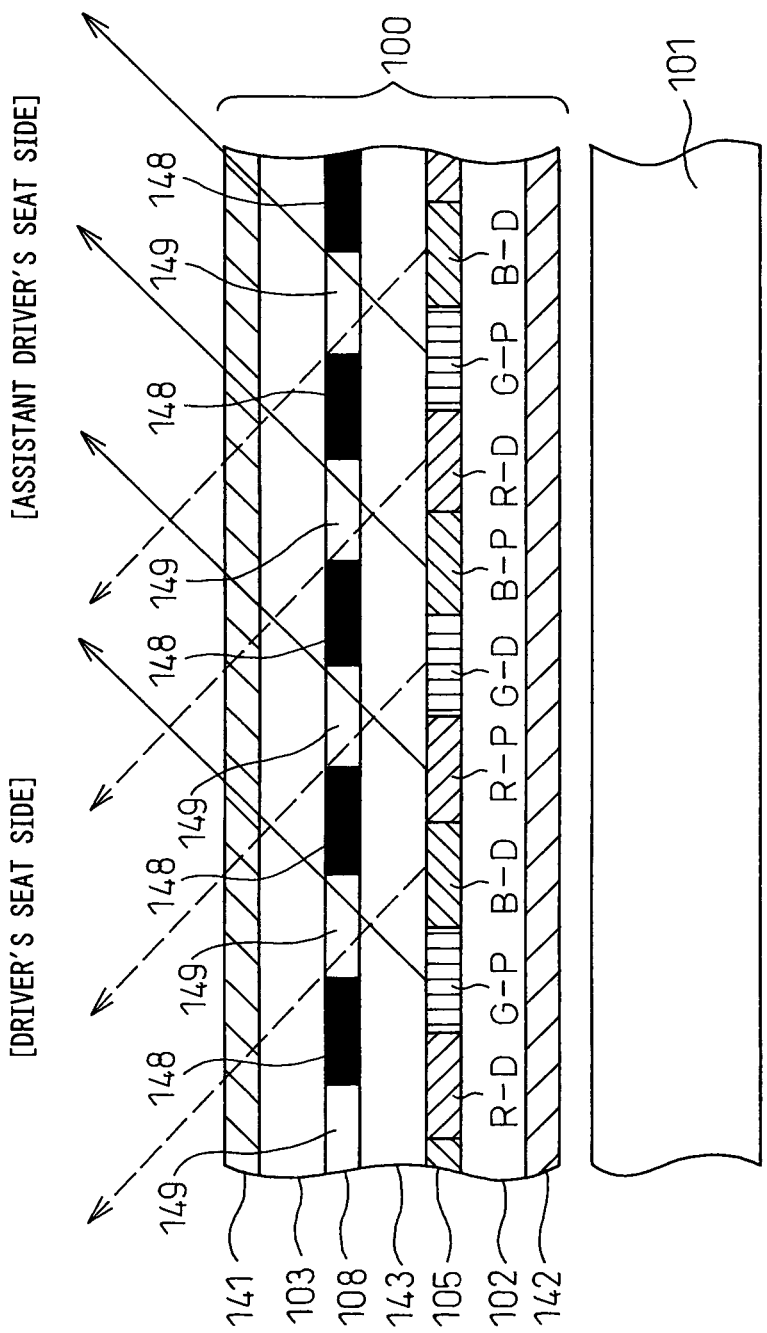
FIG. 11 is a diagram schematically showing the structure of a liquid crystal panel.

FIG. 11 is a cross-sectional view schematically showing the structure of the liquid crystal panel.

As shown in FIG. 11, the liquid crystal panel 100 comprises a first polarizer 141, a first glass substrate 103, a parallax barrier 108 that functions as a barrier, a second glass substrate 102, a liquid crystal layer 105, a third glass substrate 143, and a second polarizer 142. Here, the third glass substrate 143 may be replaced by other transparent material.

The liquid crystal layer 105 contains a plurality of pixels divided into groups of strip-like pixel columns extending in the vertical direction of the screen, forming a first pixel group for producing a display for the passenger's seat side (P) and a second pixel group for producing a display for the driver's seat side (D). In the case of FIG. 11, R-D (red pixels, the driver's seat side), G-D (green pixels, the driver's seat side), and B-D (blue pixels, the driver's seat side) belong to the second pixel group. Likewise, R-P (red pixels, the passenger's seat side), G-P (green pixels, the passenger's seat side), and B-P (blue pixels, the passenger's seat side) belong to the first pixel group.

The parallax barrier 108 is formed from polycarbonate or the like. Light-blocking bands 148 and light-transmitting bands 149 are formed in alternating fashion in the parallax barrier 108.

Because of the action of the parallax barrier 108, only the second display image displayed by the second pixel group is visible from the driver's seat side, and likewise, only the first display image displayed by the first pixel group is visible from the passenger's seat side. Actually, each observer views an image displayed in alternate strip-like segments out of the plurality of segments into which one screen is divided, but since the width of each pixel is very small, different images can be viewed from the driver seat side and the passenger's seat side, respectively.

Figure 12:
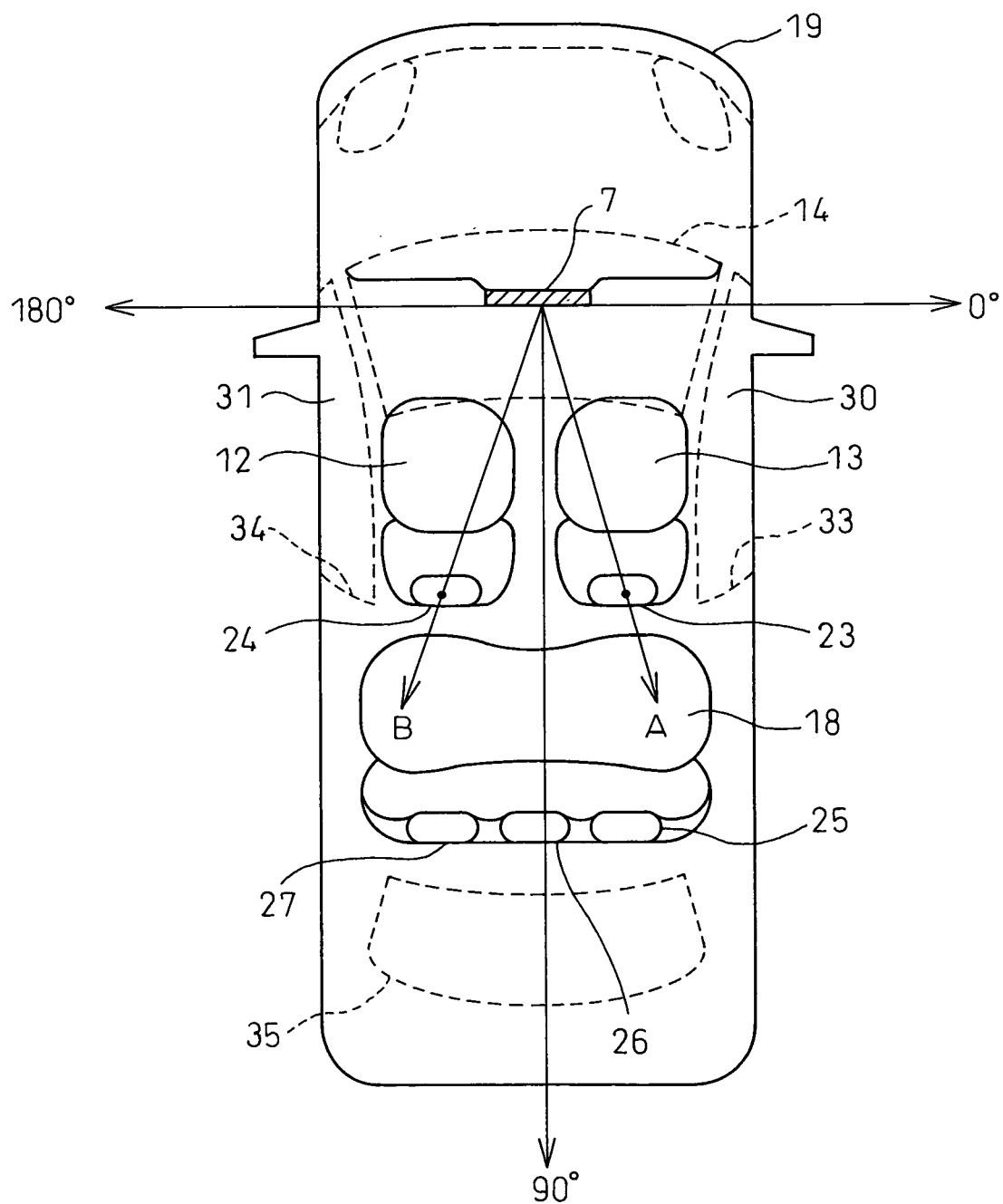
FIG. 12 is a diagram showing a mounting example of the display device.

FIG. 12 is a diagram showing an example in which the display device is mounted in a vehicle.

As shown in FIG. 12, the display unit 7 of the display device 20 is mounted in the panel inside the vehicle 19 so as to be substantially centered between the driver's seat 13 and the assistance driver's seat 12. Further, as shown in FIG. 12, the vehicle 19 includes the driver's seat headrest 23, the passenger's seat headrest 24, a rear seat 18, rear seat headrests 25 to 27, a driver side door 30, an assistant driver side door 31, a windshield 14, a driver side door window 33, an assistant driver side door window 35, and a rear window 35.

In the present embodiment, as shown in FIG. 12, one longitudinal end of the display unit is taken as the reference (0°) relative to which the angle at which to view the display device (the angle of viewing) is measured. The line extending from the center of the liquid crystal panel 100 (the intersection of the diagonals of the screen) toward the center of the driver's seat headrest 23 is taken as direction A, and the line extending from the center of the liquid crystal panel 100 toward the center of the passenger's seat headrest 24 is taken as direction B. The driver's seat and the assistant driver' seat in FIG. 12 may be interchanged.

Figure 13:
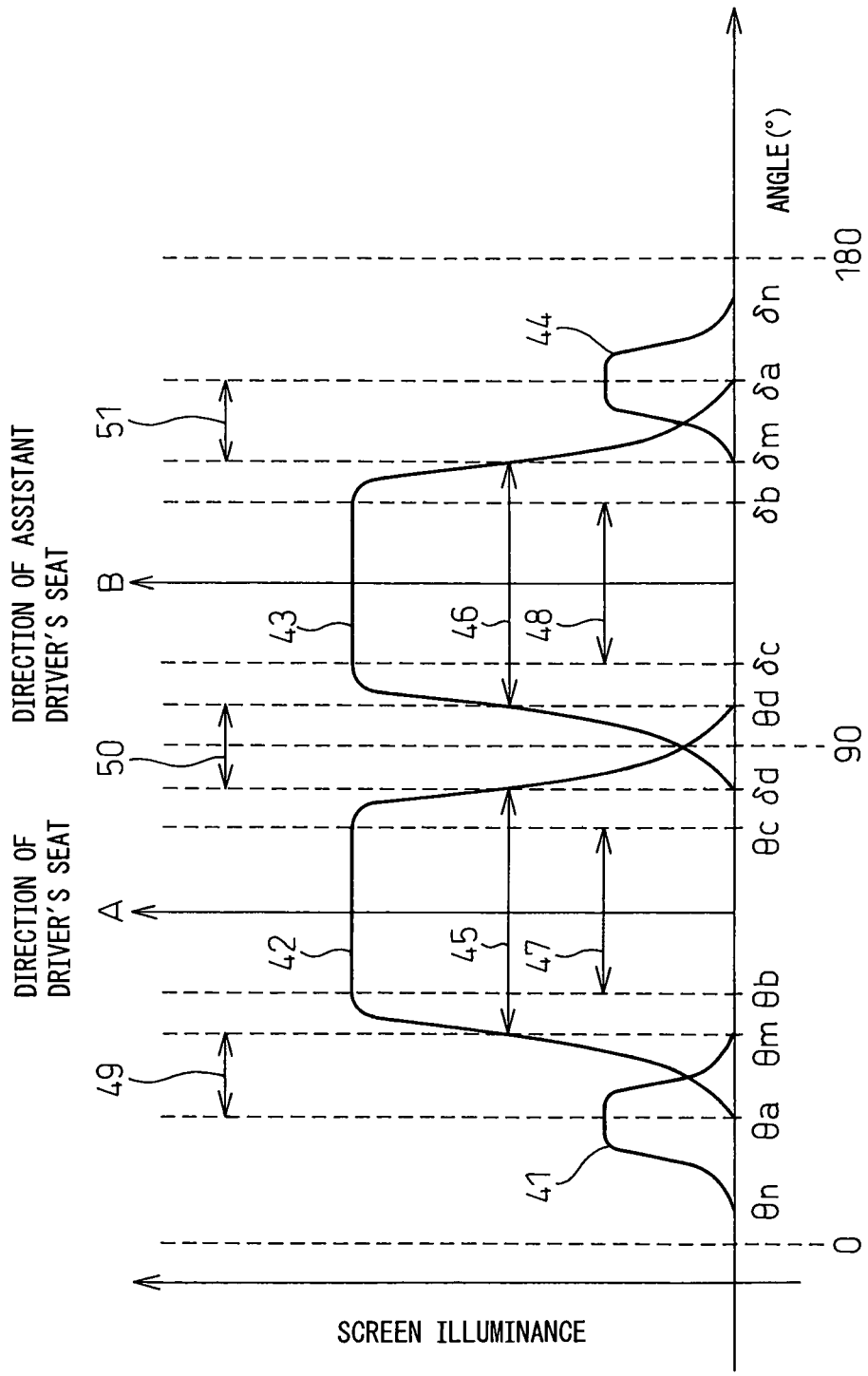
FIG. 13 is a diagram showing the relationship between illuminance and the angle of viewing.

FIG. 13 is a diagram showing the relationship between the illuminance on the liquid crystal panel and the angle of viewing.

When different images are displayed for the driver's seat occupant and the passenger's seat occupant on the liquid crystal panel 100 that can present the different images in the driver's seat direction A and the passenger's seat direction B, respectively, by using the parallax barrier 108, and when the viewpoint is moved from the angle of viewing 0° toward 180°, the screen illuminance changes as shown in FIG. 13.

When the angle of viewing is in the range between the reference point (0°) and θn, neither image is visible. On the other hand, when the angle of viewing is in the range of θn to θm, the first display image 41 for the passenger's seat side is visible at low illuminance levels for the reason to be described later.

When the angle of viewing is in the range of θa to θd, the second display image 42 for the driver's seat side is visible. Here, as the angle of viewing becomes larger than θa, the image gradually becomes clear and, in the range of θb to θc, the second display image 42 can be viewed under optimum conditions. As the angle of viewing becomes larger than θc, the image gradually becomes unclear, and at θd, the image becomes completely invisible.

When the angle of viewing is in the range of δd to δa, the first display image 43 for the passenger's seat side is visible. Here, as the angle of viewing becomes larger than δd, the image gradually becomes clear and, in the range of δc to δd, the first display image 43 can be viewed under optimum conditions. As the angle of viewing becomes larger than δb, the image gradually becomes unclear and, at δa, the image becomes completely invisible.

When the angle of viewing is in the range of δm to δn, the second display image 44 for the driver's seat side is visible at low illuminance levels for the reason to be described later. On the other hand, when the angle of viewing is in the range of δn to 180°, neither image is visible.

Further, when the angle of viewing is in the range of θa to θm, the first display image 41 and the second display image 42 are simultaneously visible with one overlapping the other (first crosstalk area). Likewise, when the angle of viewing is in the range of δd to θd, the second display image 42 and the first display image 43 are simultaneously visible with one overlapping the other (second crosstalk area). When the angle of viewing is in the range of δm to δa, the first display image 43 and the second display image 44 are simultaneously visible with one overlapping the other (third crosstalk area). It is therefore preferable that the range in which the second display image is usually viewed from the driver's seat side (the driver's side viewing range) be set so as to fall within the range of θm to θd (viewing range 45) where virtually no crosstalk occurs, and that the range in which the first display image is usually viewed from the passenger's seat side (the assistant driver's side viewing range) be set so as to fall within the range of δd to δm (viewing range 46) where virtually no crosstalk occurs. It is more preferable that the driver's side viewing range be set so as to fall within the range of θb to θc (viewing range 47) and that the assistant driver's side viewing range be set so as to fall within the range of δc to δb (viewing range 48).

The relationships between the liquid crystal panel 100, the angle of viewing, and the viewing range will be described below.

Figure 14:
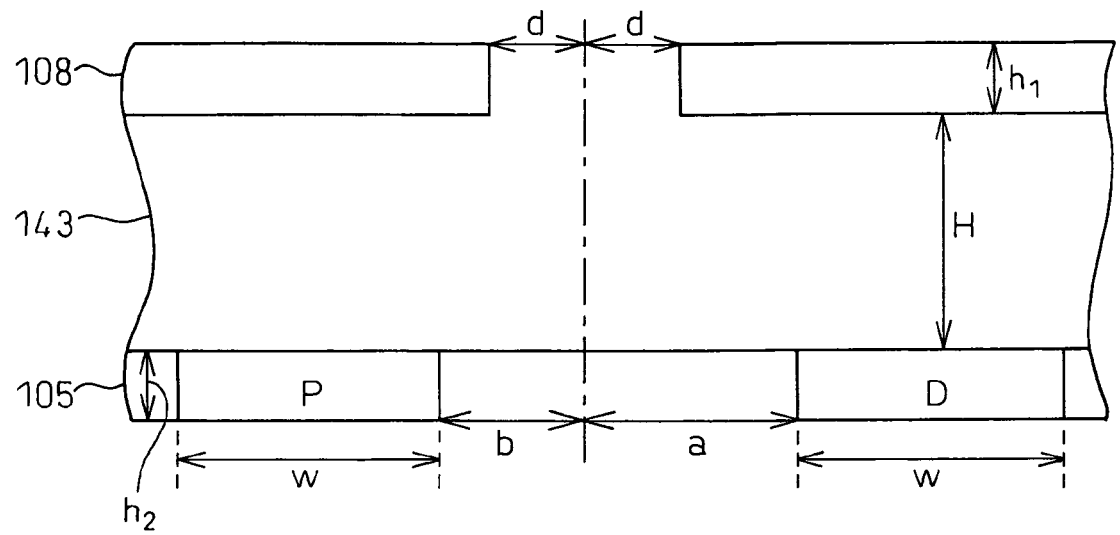
FIG. 14 is a diagram showing the relationship between a parallax barrier and a liquid crystal layer.

FIG. 14 is a diagram showing the relationship between the parallax barrier and the liquid crystal layer.

In FIG. 14, the distance by which the center of the light-transmitting band 149 of the parallax barrier 108 is displaced relative to an edge of the pixel for the driver's seat side (the pixel D) is denoted by a, the distance by which the center of the light-transmitting band 149 of the parallax barrier 108 is displaced relative to an edge of the pixel for the passenger's seat side (the pixel P) is denoted by b, the aperture width of the light-transmitting band 149 of the parallax barrier 108 is denoted by d, the thickness of the parallax barrier 108 is denoted by $h_1$, the distance between the parallax barrier 108 and the liquid crystal layer 105 (the thickness of the third glass substrate) is denoted by H, the thickness of the liquid crystal layer 105 is denoted by $h_2$, and the width of each pixel is denoted by w.

Figure 15:
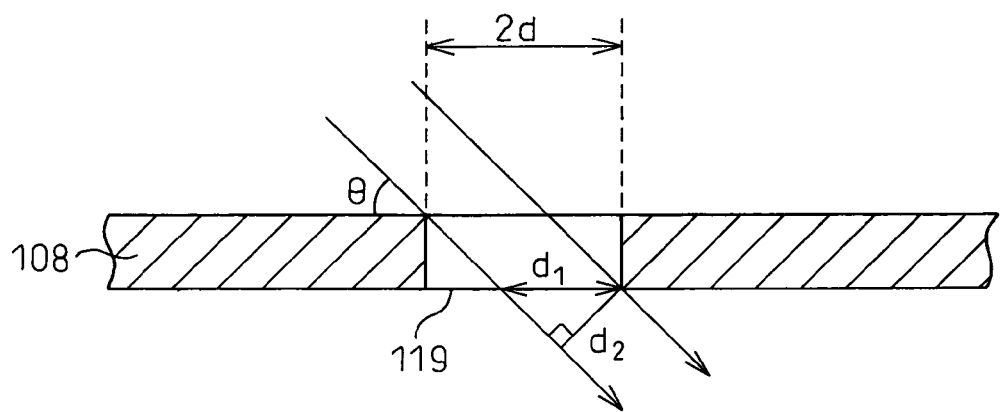
FIG. 15 is a diagram showing the relationship between the angle of viewing and the parallax barrier.
Figure 16A:
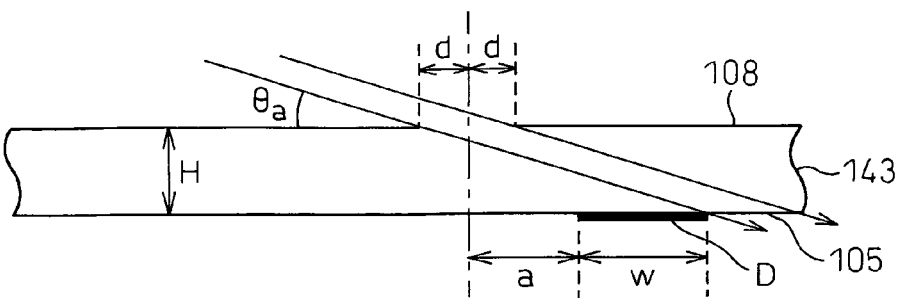
FIG. 16($a$) is a diagram showing the relationship between the angle of viewing and the parallax barrier when the angle of viewing is θa, FIG. 16(b) is a diagram showing the relationship between the angle of viewing and the parallax barrier when the angle of viewing is θb.
FIG. 16(c) is a diagram showing the relationship between the angle of viewing and the parallax barrier when the angle of viewing is θc.
FIG. 16(d) is a diagram showing the relationship between the angle of viewing and the parallax barrier when the angle of viewing is θd.
Figure 16B:
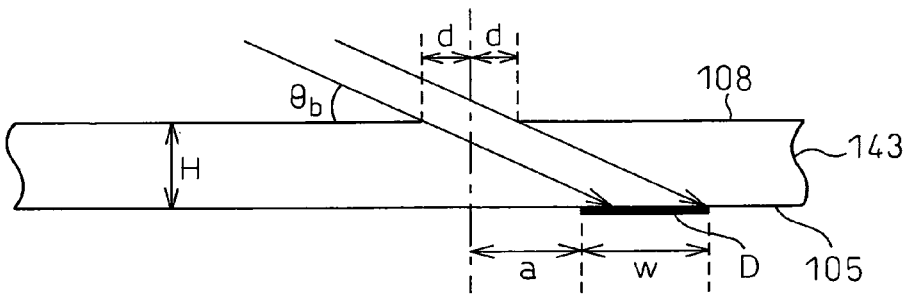
Figure 16C:
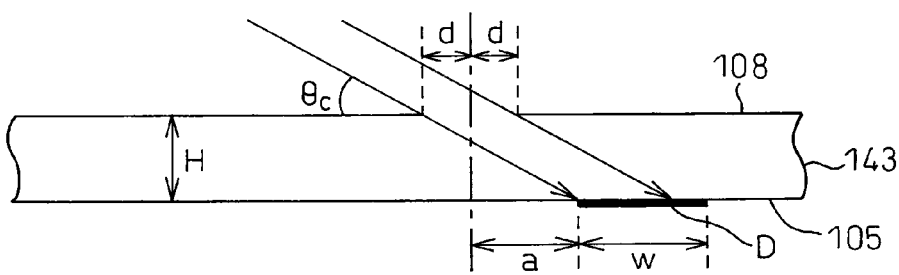
Figure 16D:
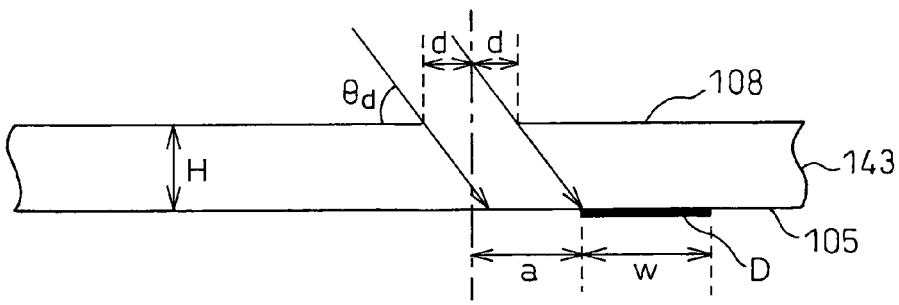

FIGS. 15 and 16 are diagrams showing the relationship between the parallax barrier and the angle of viewing.

As shown in FIG. 15, the apparent width of the light-transmitting band 149 of the parallax barrier 108 having a width of 2×d is a function of the angle of viewing θ, as shown by the following equations, in other words, the apparent width is $d_1$ (=2d−h/tan θ) in the direction parallel to the parallax barrier 108 and $d_2$ (=$d_1$·sin θ) in the direction perpendicular to the angle of viewing θ.

Since the parallax barrier 108 and the liquid crystal layer 115 are very thin, in FIG. 16 the thickness $h_1$ of the parallax barrier 108 and the thickness $h_2$ of the liquid crystal layer 115 are omitted from the following discussion.

FIG. 16(*a*) is a diagram showing the condition when the angle of viewing is θa (refer to FIG. 13). In other words, when the angle of viewing is smaller than θa, the second display image for the driver' seat side is not visible. As the angle of viewing becomes larger than θa, the image gradually becomes visible. In this case, the following equation can be derived from the relationship shown in FIG. 16(*a*).

$$\tan \theta a = H/(w+a+d)$$

$$\theta a = \arctan(H/(w+a+d)) \quad (21)$$

FIG. 16(*b*) is a diagram showing the condition when the angle of viewing is θb (refer to FIG. 13). In this condition, the pixel D is completely visible, i.e., the second display image for the driver' seat side can be viewed under optimum conditions. In this case, the following equation can be derived from the relationship shown in FIG. 16(*b*).

$$\tan \theta b = H/(w+a-d)$$

$$\theta b = \arctan(H/(w+a-d)) \quad (22)$$

FIG. 16(*c*) is a diagram showing the condition when the angle of viewing is θc (refer to FIG. 13). When the angle of viewing is not larger than θc, the pixel D is completely visible, and the second display image for the driver' seat side can be viewed under optimum conditions. As the angle of viewing becomes larger than θc, the image gradually becomes less visible. In this case, the following equation can be derived from the relationship shown in FIG. 16(*c*).

$$\tan \theta c = H/(a+d)$$

$$\theta c = \arctan(H/(a+d)) \quad (23)$$

FIG. 16(*d*) is a diagram showing the condition when the angle of viewing is θd (refer to FIG. 13). In other words, when the angle of viewing is not larger than θd, the second display image for the driver' seat side is visible. When the angle of viewing is larger than θd, the second display image for the driver' seat side is not visible. In this case, the following equation can be derived from the relationship shown in FIG. 16(*d*).

$$\tan \theta d = H/(a-d)$$

$$\theta d = \arctan(H/(a-d)) \quad (24)$$

For the first display image for the assistant driver's side also, since the condition is left-right symmetric to the above, the following equations can be derived though a detailed description is not given here.

$$\pi - \delta a = \arctan(H/(w+b+d)) \quad (25)$$

$$\pi - \delta b = \arctan(H/(w+b-d)) \quad (26)$$

$$\pi - \delta c = \arctan(H/(b+d)) \quad (27)$$

$$\pi - \delta d = \arctan(H/(b-d)) \quad (28)$$

Next, an explanation will be given of the crosstalk.

There are two types of crosstalk, first-order crosstalk in which the first display image and the second display image directly overlap each other in an area centered about the angle of viewing of 90° (corresponding to the second crosstalk area) and second-order crosstalk in which the pixel beyond the desired pixel becomes visible through another light-transmitting band of the parallax barrier 108 (corresponding to the first and third crosstalk areas).

FIG. 17 is a diagram explaining how second-order crosstalk occurs.

FIG. 17(*a*) is a diagram showing the condition when the angle of viewing is θn (refer to FIG. 13). In other words, when the angle of viewing is smaller than θn, second-order crosstalk does not occur because the pixel P for the assistant driver's side located beyond the intended pixel D is not visible through any light-transmitting band of the parallax barrier 108. However, as the angle of viewing becomes larger than θn, the pixel P for the assistant driver's side gradually becomes visible, resulting in the occurrence of second-order crosstalk. In this case, the following equation can be derived from the relationship shown in FIG. 17(*a*).

$$\tan \theta n = H/(2w+2a+b+d)$$

$$\theta n = \arctan(H/(2w+2a+b+d)) \quad (29)$$

FIG. 17(b) is a diagram showing the condition when the angle of viewing is θm (refer to FIG. 13). In other words, when the angle of viewing is not larger than θm, the pixel P for the assistant driver's side is visible, resulting in the occurrence of second-order crosstalk. However, when the angle of viewing is larger than θm, second-order crosstalk does not occur because the pixel P for the assistant driver's side is not visible through any light-transmitting band of the parallax barrier 108. In this case, the following equation can be derived from the relationship shown in FIG. 17(b).

$$\tan \theta m = H/(w+2a+b-d)$$

$$\theta m = \arctan(H/(w+2a+b-d)) \quad (30)$$

In the case of second-order crosstalk in which the second display image becomes visible from the passenger's seat side, since the condition is left-right symmetric to the above, the following equations can be derived though a detailed description is not given here.

$$\pi - \delta n = \arctan(H/(2w+a+2b+d)) \quad (31)$$

$$\pi - \delta m = \arctan(H/(w+a+2b-d)) \quad (32)$$

When installing the display device 20 in the vehicle 19, it is general practice to mount the display device 20 so as to be substantially centered between the driver's seat and the passenger's seat by considering its function. In this case, the second display image for the driver's seat occupant and the first display image for the passenger's seat occupant need not necessarily be made viewable in the angle-of-viewing ranges of 0° to 45° and 135° to 180°, respectively, in FIG. 12 because the driver side door 30 and the assistant driver side door 31 are respectively located in these ranges. Likewise, since there is no seat between the driver's seat and the passenger's seat, the second display image for the driver's seat occupant and the first display image for the passenger's seat occupant need not necessarily be made viewable in the angle-of-viewing range of 65° to 115° in FIG. 12. In other words, the driver's seat side viewing range and the passenger's seat side viewing range should be located within the angle-of-viewing ranges of 45° to 65° and 115° to 135°, respectively (assuming that the vehicle has two front seats, the driver's seat being on the right side).

Accordingly, when viewed from the driver's seat side, the parallax barrier 108 and liquid crystal layer 115 in the display device 20 should be designed so that the driver's seat side viewing range is located within the angle-of-viewing range of 45° to 65° where the first-order crosstalk and the second-order crosstalk are virtually nonexistent, i.e., θm (the position at which the first-order crosstalk begins to occur at the driver's seat side) is 45° or smaller, and δd (the position at which the second-order crosstalk begins to occur at the driver's seat side) is 65° or larger (hence, θm is smaller than δd). From the above, the parallax barrier 108 and liquid crystal layer 115 in the display device 20 must be designed so as to satisfy the following equations (1) and (2).

$$\theta m \leq 45° \quad (1)$$

$$\delta d \geq 65° \quad (2)$$

If better viewability is desired, the parallax barrier 108 and liquid crystal layer 115 in the display device 20 should be designed so that θb (the position at which first-order-side illuminance begins to drop for the driver's seat side) is 45° or smaller and θc (the position at which second-order-side illuminance begins to drop for the driver's seat side) is 65° or larger (hence, θb is smaller than θc). From the above, if the parallax barrier 108 and liquid crystal layer 115 in the display device 20 are designed so as to satisfy the following equations (3) and (4), better image viewability can be achieved on the driver's seat side.

$$\theta b \leq 45° \quad (3)$$

$$\theta c \geq 65° \quad (4)$$

On the other hand, when viewed from the passenger's seat side, the parallax barrier 108 and liquid crystal layer 115 in the display device 20 should be designed so that the passenger's seat side viewing range is located within the angle-of-viewing range of 115° to 135° where the first-order crosstalk and the second-order crosstalk are virtually nonexistent, i.e., θd (the position at which the second-order crosstalk begins to occur at the passenger's seat side) is 115° or smaller, and δm (the position at which the first-order crosstalk begins to occur at the passenger's seat side) is 135° or larger (hence, θd is smaller than δm). From the above, the parallax barrier 108 and liquid crystal layer 115 in the display device 20 must be designed so as to satisfy the following equations (5) and (6).

$$\theta d \leq 115° \quad (5)$$

$$\delta m \geq 135° \quad (6)$$

If better viewability is desired, the parallax barrier 108 and liquid crystal layer 115 in the display device 20 should be designed so that δc (the position at which the second-order-side illuminance begins to drop for the passenger's seat side) is 115° or smaller and δb (the position at which the first-order-side illuminance begins to drop for the passenger's seat side) is 135° or larger than (hence, δc is smaller than δb). From the above, if the parallax barrier 108 and liquid crystal layer 115 in the display device 20 are designed so as to satisfy the following equations (7) and (8), better image viewability can be achieved at the passenger's seat side.

$$\delta c \leq 115° \quad (7)$$

$$\delta b \geq 135° \quad (8)$$

Further, when viewed from the driver's seat side as well as from the passenger's seat side, the driver's seat side viewing range should be located within the angle-of-viewing range of 45° to 65° where the first-order crosstalk and the second-order crosstalk are virtually nonexistent, and the passenger's seat side viewing range should be located within the angle-of-viewing range of 115° to 135° where the first-order crosstalk and the second-order crosstalk are virtually nonexistent; accordingly, the parallax barrier 108 and liquid crystal layer 115 in the display device 20 must be designed so as to satisfy both the equations (1) and (2) and the equations (5) and (6). In this case, the angular viewing range within which the intended image is viewable in good condition is 20° for both the driver's seat side and the passenger's seat side.

If better viewability is desired, the parallax barrier 108 and liquid crystal layer 115 in the display device 20 must be designed so as to satisfy both equations (3) and (4) and equations (7) and (8). In this case, the angular viewing range within which the intended image is viewable in extremely good condition is 20° for both the driver's seat side and the passenger's seat side. Further, in this case, the range defined by θm and δd and the range defined by θd and δm, in other words, the angular viewing ranges within which the respectively intended images are viewable in good condition from the driver's seat side and the passenger's seat side, respectively, are about 40°. Accordingly, the viewing range of at least one of the different images displayed on the display unit 7 is not narrower than 20°, but not wider than 40°.

Further, when viewed from the driver's seat side, if it is desired to make the driver's side viewing range fall within the angle-of-viewing range of 45° to 65° where the first-order crosstalk and the second-order crosstalk are virtually nonexistent, while substantially preventing the illuminance from dropping in the viewing range, the parallax barrier 108 and liquid crystal layer 115 in the display device 20 should be designed so that θm (the position at which the first-order crosstalk begins to occur at the driver's seat side) is 45° or smaller, δd (the position at which the second-order crosstalk begins to occur at the driver's seat side) is 65° or larger, δb (the position at which the first-order-side illuminance begins to drop for the driver's seat side) is 45° or smaller, θc (the position at which the second-order-side illuminance begins to drop for the driver's seat side) is 65° or larger, θm is not larger than θb, and δd is not smaller than θc. In this case, the parallax barrier 108 and liquid crystal layer 115 in the display device 20 must be designed so as to satisfy the following equations (1) to (4), (9), and (10).

$$\theta m \leq 45° C. \quad (1)$$

$$\delta d \geq 65° C. \quad (2)$$

$$\theta b \leq 45° C. \quad (3)$$

$$\theta c \geq 65° C. \quad (4)$$

$$\theta m \leq \theta b \quad (9)$$

$$\delta d \geq \theta c \quad (10)$$

Likewise, when viewed from the passenger's seat side, if it is desired to make the assistant driver's side viewing range fall within the angle-of-viewing range of 115° to 135° where the first-order crosstalk and the second-order crosstalk are virtually nonexistent, while substantially preventing the illuminance from dropping in the viewing range, the parallax barrier 108 and liquid crystal layer 115 in the display device 20 should be designed so that θd (the position at which the second-order crosstalk begins to occur at the passenger's seat side) is 115° or smaller, δm (the position at which the first-order crosstalk begins to occur at the passenger's seat side) is 135° or larger, δm (the position at which the second-order-side illuminance begins to drop for the passenger's seat side) is 115° or smaller, and δb (the position at which the first-order-side illuminance begins to drop for the passenger's seat side) is 135° or larger. From the above, the parallax barrier 108 and liquid crystal layer 115 in the display device 20 must be designed so as to satisfy the following equations (5) to (8), (11), and (12).

$$\theta d \leq 115° C. \quad (5)$$

$$\delta m \geq 135° C. \quad (6)$$

$$\delta c \leq 115° C. \quad (7)$$

$$\delta b \geq 135° C. \quad (8)$$

$$\theta d \leq \delta c \quad (11)$$

$$\delta m \geq \delta b \quad (12)$$

Further, when viewed from the driver's seat side as well as from the passenger's seat side, if it is desired to make the driver's side viewing range fall within the angle-of-viewing range of 45° to 65° where the first-order crosstalk and the second-order crosstalk are virtually nonexistent, and also make the assistant driver's side viewing range fall within the angle-of-viewing range of 115° to 135° where the first-order crosstalk and the second-order crosstalk are virtually nonexistent, while substantially preventing the illuminance from dropping in the respective viewing ranges, the parallax barrier 108 and liquid crystal layer 115 in the display device 20 must be designed so as to satisfy the above equations (1) to (4), (9), and (10) as well as the equations (5) to (8), (11), and (12).

To achieve the good display device described above, the distance a by which the center of the light-transmitting band 149 of the parallax barrier 108 is displaced relative to an edge of the pixel for the driver's seat side (the pixel D), the distance b by which the center of the light-transmitting band 149 of the parallax barrier 108 is displaced relative to an edge of the pixel for the passenger's seat side (the pixel P), the aperture width d of the light-transmitting band 149 of the parallax barrier 108, the distance H between the parallax barrier 108 and the liquid crystal layer 115 (for example, the thickness of the third glass substrate 143), and the width w of each pixel should be set so as to satisfy the earlier given equations (21) to (32) so that θm (the position at which the first-order crosstalk begins to occur at the driver's seat side), δd (the position at which the second-order crosstalk begins to occur at the driver's seat side), δb (the position at which the first-order-side illuminance begins to drop for the driver's seat side), θc (the position at which the second-order-side illuminance begins to drop for the driver's seat side), θd (the position at which the second-order crosstalk begins to occur at the passenger's seat side), δm (the position at which the first-order crosstalk begins to occur at the passenger's seat side), δc (the position at which the second-order-side illuminance begins to drop for the passenger's seat side), and δb (the position at which the first-order-side illuminance begins to drop for the passenger's seat side) fall within the respectively specified ranges.

The above description has been given for the case where good viewing ranges can be obtained, to give specific numerical examples of the display device 20 when θm was set to about 45°, δd to about 65°, θd to about 115°, and δm to about 135°, a and b were each 0.044 mm, d was 0.044 mm, H was 0.165 mm, and W was 0.102 mm, in case of a 7-inch diagonal display (800×400 dots, pixel-to-pixel pitch=0.19 mm).

Preferably, the display device 20 is installed by setting the display unit 7 so that the center of the first viewing range (45 or 47) substantially coincides with the center of the headrest 23 of the driver's seat 13, so that the center of the second viewing range (46 or 48) substantially coincides with the center of the headrest 24 of the passenger's seat 12, so that the second crosstalk area 50 is located between the headrest 23 of the driver's seat 13 and the headrest 24 of the passenger's seat 12, and so that the first crosstalk area is located outward of the headrest 23 of the driver's seat 13 and nearer to the driver side door 30 and outward of the headrest 24 of the passenger's seat 12 and nearer to the assistant driver side door 31, respectively.

What is claimed is:
1. A display device comprising:
a display section configured to display different images intended for a plurality of different viewing ranges on the same screen, the display section including a display panel having a plurality of pixels and a parallax barrier provided on the display panel and having a plurality of apertures configured to transmit light, wherein:
the plurality of different viewing ranges are determined by the relationship of the parallax barrier relative to the display panel,
the viewing range of at least one of the different images displayed on the display section is not narrower than 20° but not wider than 40°, the viewing range is a range which can be observed by an observer located to the left relative to the display section or located to the right relative to the display section, the viewing range is prescribed by a crosstalk range, the plurality of different viewing ranges are set so as to satisfy equations $$\theta m \leq 45° \quad (1)$$

$$\delta d \geq 65° \quad (2)$$

where θm is the angle at which first first-order crosstalk begins to occur, and δd is the angle at which first second-order crosstalk begins to occur, the parallax barrier includes light-blocking bands and light-transmitting bands in alternating fashion, the first-order crosstalk is crosstalk in which a first display image and a second display image directly overlap each other in an area centered about the angle of viewing of 90°, and the second-order crosstalk is crosstalk in which the pixel beyond the desired pixel becomes visible through another light-transmitting band of the parallax barrier, wherein θm is calculated as follows:

$$\theta m = \arctan(H/(w+2a+b-d)) \quad (13)$$

δd is calculated as follows:

$$\delta d = \pi - \arctan(H/(b-d)) \quad (14)$$

where:
a represents a first displacement distance by which a center of a light-transmitting band of the parallax barrier is displaced relative to an edge of a pixel for a driver's seat side,
b represents a second displacement distance by which the center of the light-transmitting band of the parallax barrier is displaced relative to an edge of a pixel for a passenger's seat side,
d represents an aperture width of the light-transmitting band of the parallax barrier,
H represents another distance between the parallax barrier and a liquid crystal layer of the display panel, and
w represents a width of each pixel of the plurality of pixels.

2. The display device according to claim 1, wherein θm is set approximately equal to 45°, and δd is set approximately equal to 65°.

3. The display device according to claim 1, wherein one of said plurality of different viewing ranges is set so as to satisfy equations $$\theta b \leq 45° \quad (3)$$

$$\theta c \geq 65° \quad (4)$$

where θb is the angle at which first first-order-side illuminance begins to drop, and θc is the angle at which first second-order-side illuminance begins to drop.

4. The display device according to claim 3, wherein said θb is set approximately equal to 45°, and θc is set approximately equal to 65°.

5. The display device according to claim 1, wherein one of said plurality of different viewing ranges is set so as to satisfy equations $$\theta d \leq 115° \quad (5)$$

$$\delta m \geq 135° \quad (6)$$

where θd is the angle at which second second-order crosstalk begins to occur, and δm is the angle at which second first-order crosstalk begins to occur.

6. The display device according to claim 5, wherein said θd is set approximately equal to 115°, and δm is set approximately equal to 135°.

7. The display device according to claim 1, wherein one of said plurality of different viewing ranges is set so as to satisfy equations $$\delta c \leq 115° \quad (7)$$

$$\delta b \geq 135° \quad (8)$$

where δc is the angle at which second second-order-side illuminance begins to drop, and δb is the angle at which second first-order-side illuminance begins to drop.

8. The display device according to claim 7, wherein said δc is set approximately equal to 115°, and δb is set approximately equal to 135°.

9. The display device according to claim 1, wherein one of said plurality of different viewing ranges is set so as to satisfy equations $$\theta m \leq 45° \quad (1)$$

$$\delta d \geq 65° \quad (2)$$

$$\theta b \leq 45° \quad (3)$$

$$\theta c \geq 65° \quad (4)$$

$$\theta m \leq \theta b \quad (9)$$

$$\delta d \geq \theta c \quad (10)$$

where θb is the angle at which first first-order-side illuminance begins to drop, and θc is the angle at which first second-order-side illuminance begins to drop.

10. The display device according to claim 1, wherein one of said plurality of different viewing ranges is set so as to satisfy equations $$\theta d \geq 115° \quad (5)$$

$$\delta m \geq 135° \quad (6)$$

$$\delta c \leq 115° \quad (7)$$

$$\delta b \geq 135° \quad (8)$$

$$\theta d \leq \delta c \quad (11)$$

$$\delta m \geq \delta b \quad (12)$$

where δc is the angle at which second second-order-side illuminance begins to drop, δb is the angle at which second first-order-side illuminance begins to drop, θd is the angle at which second second-order crosstalk begins to occur, and δm is the angle at which second first-order crosstalk begins to occur.

11. The display device according to claim 1, wherein one of said plurality of different viewing ranges is set so as to satisfy equations $$\theta m \leq 45° \quad (1)$$

$$\delta d \geq 65° \quad (2)$$

and another one of said plurality of different viewing ranges is set so as to satisfy equations $$\theta d \leq 115° \quad (5)$$

$$\delta m \geq 135° \quad (6)$$

where θd is the angle at which second second-order crosstalk begins to occur, and δm is the angle at which second first-order crosstalk begins to occur.

12. The display device according to claim 1, wherein one of said plurality of different viewing ranges is set so as to satisfy equations $$\theta m \leq 45° \quad (1)$$

$$\delta d \geq 65° \quad (2)$$

$$\theta b \leq 45° \quad (3)$$

$$\theta c \geq 65° \quad (4)$$

$$\theta m \leq \theta b \quad (9)$$

$$\delta d \geq \theta c \quad (10)$$

and another one of said plurality of different viewing ranges is set so as to satisfy equations $$\theta d \leq 115° \quad (5)$$

$$\delta m \geq 135° \quad (6)$$

$$\delta c \leq 115° \quad (7)$$

$$\delta b \geq 135° \quad (8)$$

$$\theta d \leq \delta c \quad (11)$$

$$\delta m \geq \delta b \quad (12)$$

where θb is the angle at which first first-order-side illuminance begins to drop, θc is the angle at which first second-order-side illuminance begins to drop, δc is the angle at which second second-order-side illuminance begins to drop, δb is the angle at which second first-order-side illuminance begins to drop, θd is the angle at which second second-order crosstalk begins to occur, and δm is the angle at which second first-order crosstalk begins to occur.

13. The display device according to claim 1, wherein one of said plurality of different viewing ranges is set so as to cover at least a range not smaller than 45° but not larger than 65° in terms of an angle relative to a reference plane that extends from the center of said display section along a longitudinal direction of said display section, and
   another one of said plurality of different viewing ranges is set so as to cover at least a range not smaller than 115° but not larger than 135° in terms of an angle relative to said reference plane.

14. The display device according to claim 1, wherein a crosstalk range is located between the viewing range that can be observed by the observer located to the left relative to the display section and the viewing range located to the right relative to the display section, the crosstalk range being a range displaying an image intended for the observer located to the left relative to the display device overlapped with an image intended for the observer located to the right relative to the display device.

15. The display device according to claim 1, wherein the display device is mounted in a vehicle between a driver's seat and a passenger's seat such that one of a driver's viewing range or a passenger's viewing range satisfies the equations $$\theta m \leq 45° \quad (1)$$

$$\delta d \geq 65° \quad (2).$$

16. The display device according to claim 1, wherein neither the first-order crosstalk nor the second-order crosstalk occur between θm and δd.

17. A method for mounting a vehicle-mounted display device having a display section that displays different images intended for a plurality of different viewing ranges on the same screen, and that provides a first viewing range within which one of said different images is viewable and a crosstalk range within which at least two of said different images are simultaneously visible with one overlapping the other, the method comprising:
   mounting said display device forwardly of a position between two seats inside a vehicle in such a manner that said crosstalk range is located between said two seats, and
   providing a display panel in the display device, the display panel having a plurality of pixels and a parallax barrier provided on the display panel and having a plurality of apertures configured to transmit light, wherein:
   the plurality of different viewing ranges are determined by the relationship of the parallax barrier relative to the display panel,
   the viewing range is prescribed by a crosstalk range,
   the plurality of different viewing ranges are set so as to satisfy equations $$\theta m \leq 45° \quad (1)$$

$$\delta d \geq 65° \quad (2)$$

where θm is the angle at which first first-order crosstalk begins to occur, and δd is the angle at which first second-order crosstalk begins to occur,
   the parallax barrier includes light-blocking bands and light-transmitting bands in alternating fashion,
   the first-order crosstalk is crosstalk in which a first display image and a second display image directly overlap each other in an area centered about the angle of viewing of 90° and
   the second-order crosstalk is crosstalk in which the pixel beyond the desired pixel becomes visible through another light-transmitting band of the parallax barrier, wherein
   θm is calculated as follows:

$$\theta m = \arctan(H/(w+2a+b-d)) \quad (13)$$

δd is calculated as follows:

$$\delta d = \pi - \arctan(H/(b-d)) \quad (14)$$

where:
   a represents a first displacement distance by which a center of a light-transmitting band of the parallax barrier is displaced relative to an edge of a pixel for a driver's seat side,
   b represents a second displacement distance by which the center of the light-transmitting band of the parallax barrier is displaced relative to an edge of a pixel for a passenger's seat side,
   d represents an aperture width of the light-transmitting band of the parallax barrier,
   H represents another distance between the parallax barrier and a liquid crystal layer of the display panel, and
   w represents a width of each pixel of the plurality of pixels.

18. The display device according to claim 17, wherein neither the first-order crosstalk nor the second-order crosstalk occur between θm and δd.

19. A method for mounting a vehicle-mounted display device having a display section that displays different images intended for a plurality of different viewing ranges on the same screen, the method comprising:

mounting the display device forwardly of a position between two seats inside a vehicle in such a manner that one of the plurality of different viewing ranges covers at least a range not smaller than 45° but not larger than 65° in terms of an angle relative to a reference plane defined at one longitudinal end of said display section and that another one of said plurality of different viewing ranges covers at least a range not smaller than 115° but not larger than 135° in terms of an angle relative to said reference plane, and providing a display panel in the display device, the display panel having a plurality of pixels and a parallax barrier provided on the display panel and having a plurality of apertures configured to transmit light, wherein:

the plurality of different viewing ranges are determined by the relationship of the parallax barrier relative to the display panel, the viewing range is a range which can be observed from a driver's seat or a passenger's seat, the viewing range is prescribed by a crosstalk range, said plurality of different viewing ranges are set so as to satisfy equations $$\theta m \leq 45° \qquad (1)$$

$$\delta d \geq 65° \qquad (2)$$

and another plurality of different viewing ranges are set so as to satisfy equations $$\theta d \leq 115° \qquad (5)$$

$$\delta m \geq 135° \qquad (6)$$

where θm is the angle at which first first-order crosstalk begins to occur, δd is the angle at which first second-order crosstalk begins to occur, θd is the angle at which second second-order crosstalk begins to occur, and δm is the angle at which second first-order crosstalk begins to occur, and the parallax barrier includes light-blocking bands and light-transmitting bands in alternating fashion, the first-order crosstalk is crosstalk in which a first display image and a second display image directly overlap each other in an area centered about the angle of viewing of 90°, and the second-order crosstalk is crosstalk in which the pixel beyond the desired pixel becomes visible through another light-transmitting band of the parallax barrier, wherein θm is calculated as follows:

$$\theta m = \arctan(H/(w+2a+b-d)) \qquad (13)$$

δd is calculated as follows:

$$\delta d = \pi - \arctan(H/(b-d)) \qquad (14)$$

where:

a represents a first displacement distance by which a center of a light-transmitting band of the parallax barrier is displaced relative to an edge of a pixel for a driver's seat side, b represents a second displacement distance by which the center of the light-transmitting band of the parallax barrier is displaced relative to an edge of a pixel for a passenger's seat side, d represents an aperture width of the light-transmitting band of the parallax barrier, H represents another distance between the parallax barrier and a liquid crystal layer of the display panel, and w represents a width of each pixel of the plurality of pixels.

20. The display device according to claim 19, wherein neither the first-order crosstalk nor the second-order crosstalk occur between θm and δd.

* * * * *